United States Patent
Sato et al.

(10) Patent No.: US 10,271,058 B2
(45) Date of Patent: Apr. 23, 2019

(54) IMAGING APPARATUS AND IMAGING SYSTEM

(71) Applicant: Panasonic Intellectual Property Management Co., Ltd., Osaka (JP)

(72) Inventors: Satoshi Sato, Kyoto (JP); Kunio Nobori, Osaka (JP); Takeo Azuma, Kyoto (JP); Ayako Maruyama, Osaka (JP); Nobuhiko Wakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 15/612,427

(22) Filed: Jun. 2, 2017

(65) Prior Publication Data
US 2017/0366792 A1 Dec. 21, 2017

(30) Foreign Application Priority Data
Jun. 16, 2016 (JP) .................................. 2016-120309

(51) Int. Cl.
G06T 3/40 (2006.01)
H04N 1/41 (2006.01)
(Continued)

(52) U.S. Cl.
CPC ......... *H04N 19/186* (2014.11); *G06T 3/4015* (2013.01); *H04N 1/41* (2013.01); *H04N 1/64* (2013.01); *H04N 9/045* (2013.01)

(58) Field of Classification Search
CPC ..... H04N 19/186; H04N 9/045; G06T 3/4015
See application file for complete search history.

(56) References Cited

U.S. PATENT DOCUMENTS 5,629,734 A 5/1997 Hamilton, Jr. et al.
5,793,428 A * 8/1998 Coelho ................ H04N 19/176
375/240.13
(Continued)

FOREIGN PATENT DOCUMENTS

JP 4-176170 6/1992
JP 5-336376 12/1993
(Continued)

OTHER PUBLICATIONS

Leonid I. Rudin et al., "Nonlinear total variation based noise removal algorithms", Physica D, vol. 60, pp. 259-268, Nov. 1992.
(Continued)

*Primary Examiner* — Jason A Flohre
(74) *Attorney, Agent, or Firm* — Wenderoth, Lind & Ponack, L.L.P.

(57) ABSTRACT

An imaging apparatus includes an imaging optical system that forms an optical signal, an imaging device that includes a plurality of pixels and that converts the optical signal formed on the plurality of pixels into an electrical signal, a color filter that is arranged between the imaging optical system and the imaging device and that has a different optical transmittance for each of the plurality of pixels and each of a plurality of wavelength ranges, and a transmission data compression circuit that compresses the electrical signal obtained by the imaging device. The sum of products of an optical transmittance group relating to a plurality of optical transmittances of the color filter for each of the plurality of pixels in the plurality of wavelength ranges and coefficients common to the plurality of pixels is the same between the plurality of pixels.

5 Claims, 18 Drawing Sheets

(51) Int. Cl.
*H04N 1/64* (2006.01)
*H04N 9/04* (2006.01)
*H04N 19/186* (2014.01)

(56) References Cited

U.S. PATENT DOCUMENTS

| | | | |
|---|---|---|---|
| 5,844,647 | A | 12/1998 | Maruno et al. |
| 6,388,709 | B1* | 5/2002 | Kobayashi ........ H01L 27/14621 348/270 |
| 2006/0017826 | A1 | 1/2006 | Sekimoto et al. |
| 2007/0153105 | A1* | 7/2007 | Sung ................ H01L 27/14621 348/272 |
| 2011/0249159 | A1* | 10/2011 | Fukunaga .............. H04N 9/045 348/279 |
| 2011/0274177 | A1* | 11/2011 | Park .................... H04N 19/105 375/240.24 |

FOREIGN PATENT DOCUMENTS

| | | |
|---|---|---|
| JP | 9-218425 | 8/1997 |
| JP | 2001-267543 | 9/2001 |
| JP | 2006-026234 | 2/2006 |
| JP | 2012-244495 | 12/2012 |
| WO | 2011/063311 | 5/2011 |

OTHER PUBLICATIONS

Shunsuke Ono et al., "Decorrelated Vectorial Total Variation", IEEE Conference on Computer Vision and Pattern Recognition, Jun. 2014.

Jianwei Ma, "Improved Iterative Curvelet Thresholding for Compressed Sensing and Measurement", IEEE Transactions on Instrumentation and Measurement, vol. 60, No. 1, pp. 126-136, Jan. 2011.

Michal Aharon et al., "K-SVD: An Algorithm for Designing Overcomplete Dictionaries for Sparse Representation", IEEE Transactions on Signal Processing, vol. 54, No. 11, pp. 4311-4322, Nov. 2006.

Daisuke Kiku et al., "Minimized-Laplacian Residual Interpolation for Color Image Demosaicking", IS & T/SPIE Electronic Imaging, Mar. 2014.

* cited by examiner

|   | u=1 | u=2 | u=3 | u=4 |
|---|-----|-----|-----|-----|
| v=1 | $y_{1,1}$ | $y_{2,1}$ | $y_{3,1}$ | $y_{4,1}$ |
| v=2 | $y_{1,2}$ | $y_{2,2}$ | $y_{3,2}$ | $y_{4,2}$ |
| v=3 | $y_{1,3}$ | $y_{2,3}$ | $y_{3,3}$ | $y_{4,3}$ |
| v=4 | $y_{1,4}$ | $y_{2,4}$ | $y_{3,4}$ | $y_{4,4}$ |

| MODULATION INFORMATION | ENCODED MODULATED IMAGE DATA |
|---|---|
| HEADER PART | DATA PART |

FIG. 11A

| | u=1 | u=2 | u=3 | u=4 |
|---|---|---|---|---|
| v=1 | $y_{1,1}$ | $y_{2,1}$ | $y_{3,1}$ | $y_{4,1}$ |
| v=2 | $y_{1,2}$ | $y_{2,2}$ | $y_{3,2}$ | $y_{4,2}$ |
| v=3 | $y_{1,3}$ | $y_{2,3}$ | $y_{3,3}$ | $y_{4,3}$ |
| v=4 | $y_{1,4}$ | $y_{2,4}$ | $y_{3,4}$ | $y_{4,4}$ |

MODULATED IMAGE

FIG. 11B

| $r_{1,1}$ | $r_{2,1}$ | $r_{3,1}$ | $r_{4,1}$ |
|---|---|---|---|
| $r_{1,2}$ | $r_{2,2}$ | $r_{3,2}$ | $r_{4,2}$ |
| $r_{1,3}$ | $r_{2,3}$ | $r_{3,3}$ | $r_{4,3}$ |
| $r_{1,4}$ | $r_{2,4}$ | $r_{3,4}$ | $r_{4,4}$ |

GENERATED R IMAGE

FIG. 11C

| $g_{1,1}$ | $g_{2,1}$ | $g_{3,1}$ | $g_{4,1}$ |
|---|---|---|---|
| $g_{1,2}$ | $g_{2,2}$ | $g_{3,2}$ | $g_{4,2}$ |
| $g_{1,3}$ | $g_{2,3}$ | $g_{3,3}$ | $g_{4,3}$ |
| $g_{1,4}$ | $g_{2,4}$ | $g_{3,4}$ | $g_{4,4}$ |

GENERATED G IMAGE

FIG. 11D

| $b_{1,1}$ | $b_{2,1}$ | $b_{3,1}$ | $b_{4,1}$ |
|---|---|---|---|
| $b_{1,2}$ | $b_{2,2}$ | $b_{3,2}$ | $b_{4,2}$ |
| $b_{1,3}$ | $b_{2,3}$ | $b_{3,3}$ | $b_{4,3}$ |
| $b_{1,4}$ | $b_{2,4}$ | $b_{3,4}$ | $b_{4,4}$ |

GENERATED B IMAGE

CORRECT IMAGE

ACPI DEMOSAICED IMAGE

MLRI DEMOSAICED IMAGE

RESTORED IMAGE ACCORDING
TO EMBODIMENT

CORRECT IMAGE

ACPI DEMOSAICED IMAGE

MLRI DEMOSAICED IMAGE

RESTORED IMAGE ACCORDING
TO EMBODIMENT

CORRECT IMAGE

ACPI DEMOSAICED IMAGE

MLRI DEMOSAICED IMAGE

RESTORED IMAGE ACCORDING
TO EMBODIMENT

CORRECT IMAGE

ACPI DEMOSAICED IMAGE

MLRI DEMOSAICED IMAGE

RESTORED IMAGE ACCORDING TO EMBODIMENT

FIG. 19

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

IMAGING APPARATUS AND IMAGING SYSTEM

BACKGROUND

1. Technical Field

The present disclosure relates to an imaging apparatus and the like used for compressed sensing.

2. Description of the Related Art

In order to capture a color image, information regarding three different wavelength ranges of red (R), green (G), and blue (B), which are three primary colors of light, needs to be obtained. There are color imaging apparatuses that obtain information regarding R, G, and B using three image sensors. In most color imaging apparatuses, however, only one image sensor is included for the purpose of reduction in size and cost. Most color imaging apparatuses, therefore, obtain information regarding R, G, and B with one image sensor.

A method is known in which information regarding one of the three wavelength ranges of R, G, and B is obtained in each pixel and then information regarding the three wavelength ranges of R, G, and B is obtained in each pixel by performing processing called "demosaicing".

FIG. 19 is a schematic diagram illustrating a Bayer pattern, which is widely used (e.g., U.S. Pat. No. 5,629,734). In the Bayer pattern, half of all pixels are G pixels and R and B pixels each occupy a quarter of all the pixels to mimic visual sensation characteristics of a human eye. Information regarding the three wavelength ranges of R, G, and B is then obtained in all the pixels through demosaicing.

On the other hand, in Japanese Unexamined Patent Application Publication (Translation of PCT Application) No. 2013-511924, a technique is disclosed in which optical filter elements are arranged in a random color pattern, and demosaicing is performed by using a compressed sensing technique for a sample data group.

Techniques relating to imaging and image processing are also disclosed in L. I. Rudin, S. J. Osher, and E. Fatemi, "Nonlinear Total Variation Based Noise Removal Algorithms", Physica D, vol. 60, pp. 259-268, 1992, S. Ono and I. Yamada, "Decorrelated Vectorial Total Variation", IEEE Conference on Computer Vision and Pattern Recognition, 2014, J. Ma, "Improved Iterative Curvelet Thresholding for Compressed Sensing and Measurement", IEEE Transactions on Instrumentation & Measurement, vol. 60, no. 1, pp. 126-136, 2011, M. Aharon, M. Elad, and A. M. Bruckstein, "K-SVD: An Algorithm for Designing Overcomplete Dictionaries for Sparse Representation", IEEE Transactions on Image Processing, vol. 54, no. 11, pp. 4311-4322, 2006, and D. Kiku, Y. Monno, M. Tanaka, and M. Okutomi, "Minimized-Laplacian Residual Interpolation for Color Image Demosaicking", IS&T/SPIE Electronic Imaging, 2014. "Nonlinear Total Variation Based Noise Removal Algorithms" relates to an algorithm for removing noise from images. "Decorrelated Vectorial Total Variation" relates to a technique for restoring color images. "Improved Iterative Curvelet Thresholding for Compressed Sensing and Measurement" relates to a restoration method in a compressed sensing technique. "K-SVD: An Algorithm for Designing Overcomplete Dictionaries for Sparse Representation" relates to an algorithm for processing images. "Minimized-Laplacian Residual Interpolation for Color Image Demosaicking" relates to demosaicing for color images.

In U.S. Pat. No. 5,629,734 and Japanese Unexamined Patent Application Publication (Translation of PCT Application) No. 2013-511924, however, only information regarding one of the three wavelength ranges of R, G, and B is obtained in each pixel of an image sensor. The resolution of a color image obtained as a result of demosaicing, therefore, decreases, and an artifact called "false color" is occurred. In addition, if the amount of information obtained by a plurality of pixels is large, speed at which the information is transmitted decreases, and memory space used to accumulate the information increases.

SUMMARY

One non-limiting and exemplary embodiment provides an imaging apparatus and the like capable of more appropriately obtaining information for generating an image.

In one general aspect, the techniques disclosed here feature an imaging apparatus including an imaging optical system that forms an optical signal, an imaging device that includes a plurality of pixels and that converts the optical signal formed on the plurality of pixels into an electrical signal, a color filter that is arranged between the imaging optical system and the imaging device and that has a different optical transmittance for each of the plurality of pixels and each of a plurality of wavelength ranges, and a transmission data compression circuit that compresses the electrical signal obtained by the imaging device. The sum of products of an optical transmittance group relating to a plurality of optical transmittances of the color filter for each of the plurality of pixels in the plurality of wavelength ranges and coefficients, which include a coefficient different from 0, common to the plurality of pixels is the same between the plurality of pixels.

With the imaging apparatus and the like according to the aspect of the present disclosure, information for generating an image can be obtained more appropriately.

It should be noted that the above general or specific aspect may be implemented as a system, a method, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 11A to 11D are schematic diagrams illustrating a modulated image and generated images at a time when the number of pixels of an imaging device is 16 according to the embodiment;

FIG. 19 is a schematic diagram illustrating a Bayer pattern.

DETAILED DESCRIPTION

Figure 1:
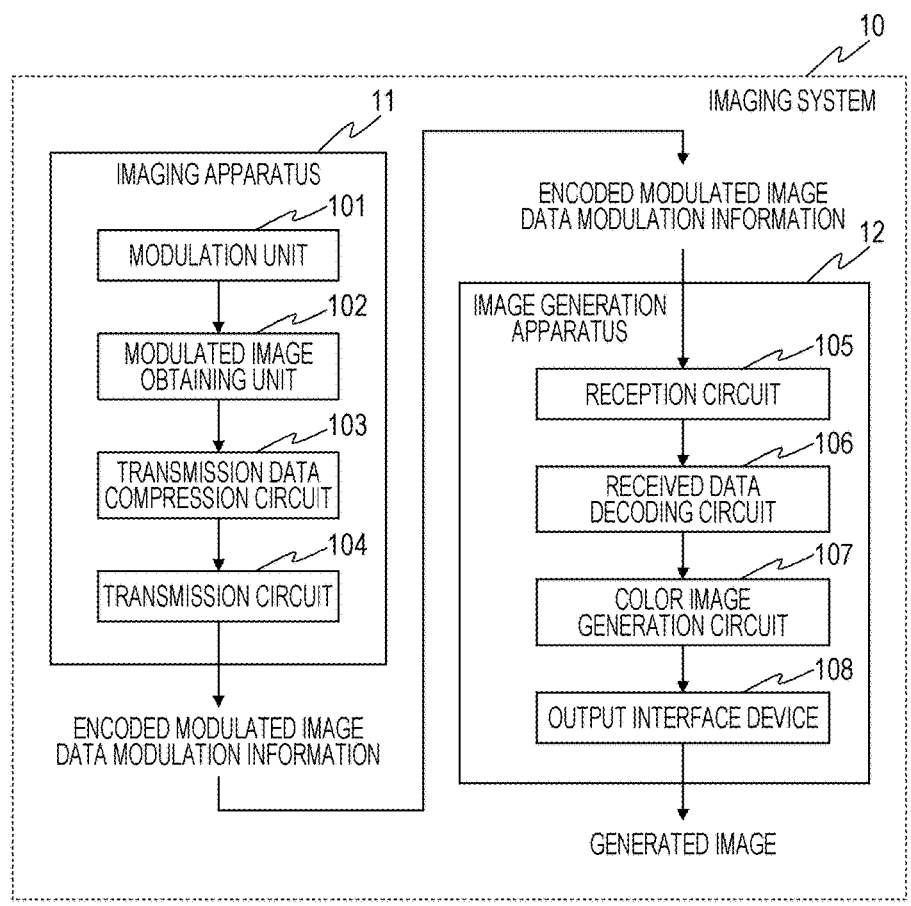
FIG. 1 is a schematic diagram illustrating the configuration of an imaging system according to an embodiment.

Underlying Knowledge Forming Basis of Present Disclosure

In the techniques described in U.S. Pat. No. 5,629,734 and Japanese Unexamined Patent Application Publication (Translation of PCT Application) No. 2013-511924, for example, only information regarding any of R, G, and B is obtained in each pixel. The information obtained by these techniques is not necessarily sufficient, and an appropriate image might not be generated.

Each pixel, therefore, is configured to obtain, for example, information in which R, G, and B are mixed. At this time, R, G, and B are randomly mixed in each pixel so that the information in which R, G, and B are mixed can be separated into information regarding R, information regarding G, and information regarding B using a compressed sensing technique. As a result, a larger amount of information can be obtained, and an appropriate image can be generated from the obtained information using the compressed sensing technique.

On the other hand, similarity between neighboring (adjacent) pixels might be used in compression of information regarding an image. When R, G, and B are randomly mixed, however, the similarity between neighboring pixels is assumed to decrease. It is therefore difficult to further compress the information in which R, G, and B are randomly mixed.

An imaging apparatus according to an aspect of the present disclosure includes an imaging optical system that forms an optical signal, an imaging device that includes a plurality of pixels and that converts the optical signal formed on the plurality of pixels into an electrical signal, a color filter that is arranged between the imaging optical system and the imaging device and that has a different optical transmittance for each of the plurality of pixels and each of a plurality of wavelength ranges, and a transmission data compression circuit that compresses the electrical signal obtained by the imaging device. The sum of products of an optical transmittance group relating to a plurality of optical transmittances of the color filter for each of the plurality of pixels in the plurality of wavelength ranges and coefficients, which include a coefficient different from 0, common to the plurality of pixels is the same between the plurality of pixels.

As a result, the imaging apparatus can obtain a sufficient amount of information using the various transmittances of the color filter. On the other hand, the plurality of optical transmittances of the color filter for each of the plurality of pixels in the plurality of wavelength ranges are given a characteristic common to the plurality of pixels. A decrease in the similarity between neighboring (adjacent) pixels, therefore, can be suppressed. The imaging apparatus can thus perform efficient compression on the basis of the similarity between neighboring pixels. That is, the imaging apparatus can more appropriately obtain information for generating an image.

For example, the coefficients may include the same coefficients. A sum of the plurality of optical transmittances of the color filter for each of the plurality of pixels in the plurality of wavelength ranges may be the same between the plurality of pixels.

As a result, sensitivity to a signal level is equalized between the plurality of pixels, and the similarity between neighboring pixels in terms of the signal level is reflected by an electrical signal obtained by the imaging device. The imaging apparatus, therefore, can perform efficient compression on the basis of the similarity between neighboring pixels.

In addition, for example, the coefficients may be determined on the basis of relative luminous efficiencies.

As a result, the sensitivity of a person to brightness is equalized between the plurality of pixels, and the similarity between neighboring pixels in terms of the brightness sensed by the person is reflected by an electrical signal obtained by the imaging device. The imaging apparatus, therefore, can perform efficient compression on the basis of the similarity between neighboring pixels.

In addition, for example, the coefficients may include luminance conversion coefficients for the plurality of wavelength ranges.

As a result, sensitivity to luminance is equalized between the plurality of pixels, and the similarity between neighboring pixels in terms of luminance is reflected by an electrical signal obtained by the imaging device. The imaging apparatus, therefore, can perform efficient compression on the basis of the similarity between neighboring pixels.

In addition, for example, the plurality of pixels may include a first pixel and a second pixel adjacent to the first pixel. The transmission data compression circuit may compress the electrical signal by encoding a difference between a value of the electrical signal in the first pixel and a value of the electrical signal in the second pixel.

As a result, an electrical signal obtained by the imaging device is efficiently compressed on the basis of the similarity between adjacent pixels.

An imaging system according to an aspect of the present disclosure may include the imaging apparatus and an image generation apparatus. The imaging apparatus may further include a transmission circuit that transmits the electrical signal compressed by the transmission data compression circuit. The image generation apparatus may include a reception circuit that receives the electrical signal transmitted from the transmission circuit, a received data decoding circuit that decompresses the electrical signal received by the reception circuit, and an image generation circuit that generates an image using modulation information indicating the plurality of optical transmittances of the color filter for the plurality of pixels and the plurality of wavelength ranges and the electrical signal decompressed by the received data decoding circuit.

As a result, the image generation apparatus can efficiently receive a compressed electrical signal from the imaging apparatus. In addition, the image generation apparatus can efficiently decompress the electrical signal without using modulation information regarding optical transmittances. The image generation apparatus can then appropriately generate an image using the decompressed electrical signal and the modulation information. That is, the imaging system can appropriately obtain an electrical signal with the imaging apparatus and appropriately generate an image with the image generation apparatus.

Furthermore, these general or specific aspects may be implemented as a system, an apparatus, a method, an integrated circuit, a computer program, a non-transitory computer-readable recording medium such as a compact disc read-only memory (CD-ROM), or any selective combination thereof.

An embodiment relating to an imaging system including an imaging apparatus and an image generation apparatus will be described hereinafter with reference to the accompanying drawings.

The embodiment described hereinafter is a general or specific example. Values, shape, materials, components, arrangement positions and connection modes of the components, steps, the order of the steps, and the like mentioned in the following embodiment are examples, and do not limit the claims. In addition, among the components described in the following embodiment, ones not described in the independent claims, which define the broadest concepts, will be described as arbitrary components.

In addition, expressions "equal" and "same" include essential equality (sameness) and substantial equality (sameness). Even if two values have an error of several percent, for example, these values can be regarded as equal to each other (the same). In addition, ordinal numbers such as "first", "second", and "third" may be added to, reassigned to, or removed from components or the like for expression purposes.

Embodiment

FIG. 1 is a schematic diagram illustrating the configuration of an imaging system 10 according to the present embodiment. The imaging system 10 according to the present embodiment includes an imaging apparatus 11 and an image generation apparatus 12. The imaging apparatus 11 includes a modulation unit 101, a modulated image obtaining unit 102, a transmission data compression circuit 103, and a transmission circuit 104. On the other hand, the image generation apparatus 12 includes a reception circuit 105, a received data decoding circuit 106, a color image generation circuit (image generation circuit) 107, and an output interface device 108.

Figure 2:
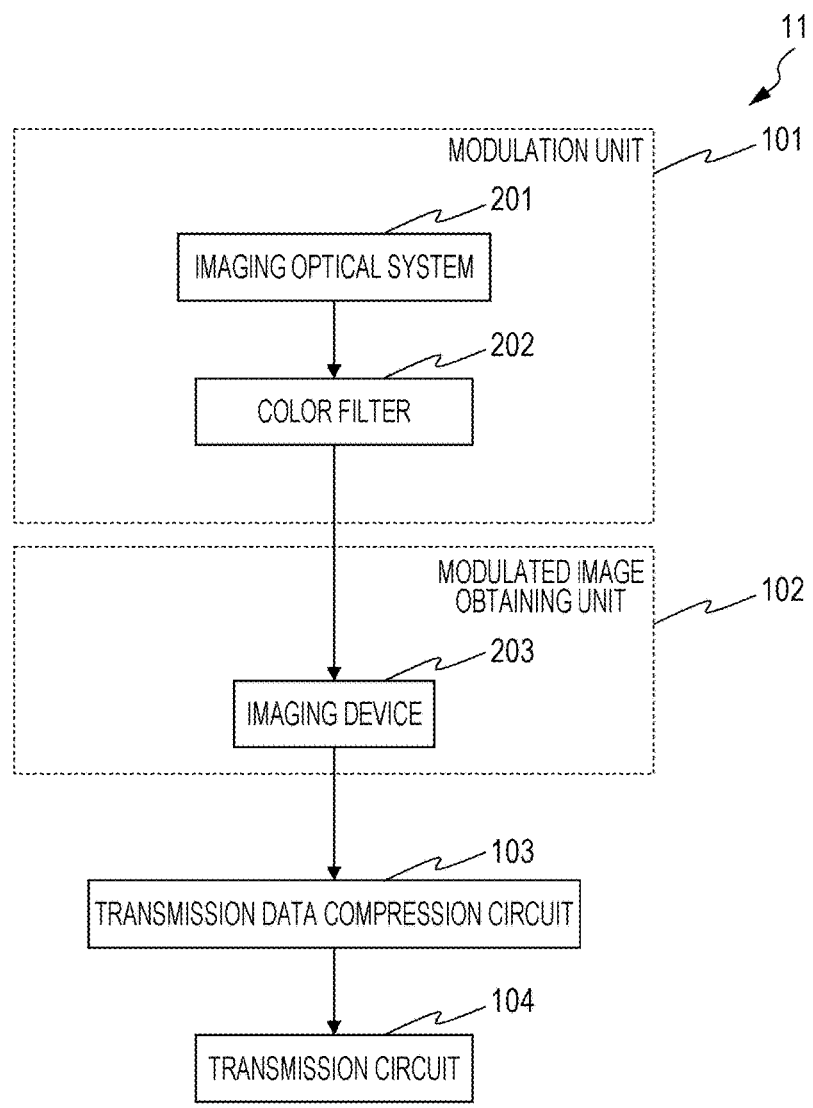
FIG. 2 is a schematic diagram illustrating the hardware configuration of an imaging apparatus according to the embodiment.

First, the imaging apparatus 11 will be described with reference to FIG. 2. FIG. 2 illustrates details of the configuration of the modulation unit 101 and the modulated image obtaining unit 102. As illustrated in FIG. 2, the modulation unit 101 corresponds to an imaging optical system 201 and a color filter 202. The modulated image obtaining unit 102 corresponds to an imaging device 203.

Imaging Optical System 201

The imaging optical system 201 includes a lens (not illustrated). The imaging optical system 201 may also include a lens position adjusting mechanism (not illustrated). Light from a subject passes through the lens and forms an optical signal. The formed optical signal represents an image of the subject. The imaging optical system 201 may include one or more lenses. The lens position adjusting mechanism is, for example, an actuator for adjusting a position at which light that has passed through the lens forms an image and a control circuit (controller) that controls how much the actuator is driven.

Color Filter 202

The color filter 202 is arranged in an optical path of light that travels from the imaging optical system 201 (the lens, more specifically) to the imaging device 203. The color filter 202 is typically arranged on a front surface of the imaging device 203.

The color filter 202 is used to filter light in a plurality of wavelength ranges incident on the imaging device 203. The color filter 202 has an optical transmittance for each of a plurality of pixels and each of the plurality of wavelength ranges. More specifically, the optical transmittance of the color filter 202 differs depending on a position corresponding to each pixel of the imaging device 203. The optical transmittance of the color filter 202 also differs depending on the wavelength range of light that passes through the color filter 202.

The front surface of the imaging device 203 can also be defined as an upper surface or a light receiving surface of the imaging device 203. An optical transmittance at a position corresponding to each pixel of the imaging device 203 will also be simply referred to as an "optical transmittance for the pixel". An optical transmittance will also be simply referred to as a "transmittance". Details of the color filter 202 will be described later.

Imaging Device 203

The imaging device 203 includes a plurality of pixels and converts an optical signal formed by the imaging optical system 201 on the plurality of pixels into an electrical signal. The electrical signal represents a modulated signal, which is an image modulated in units of pixels. That is, the imaging device 203 captures a modulated image. The imaging device 203 is arranged at a focal distance of the lens.

Transmission Data Compression Circuit 103

The transmission data compression circuit 103 compresses and encodes a modulated image captured by the imaging device 203. Details of the transmission data compression circuit 103 will be described later.

Transmission Circuit 104

The transmission circuit 104 transmits encoded modulated image data, which is obtained by encoding a modulated image using the transmission data compression circuit 103, and modulation information, which indicates the plurality of transmittances of the color filter 202, to the image generation apparatus 12. The transmission circuit 104 may employ wired communication or wireless communication. Details of a transmission process will be described later.

In the present embodiment, it is assumed that the imaging system 10 includes the transmission circuit 104 and the reception circuit 105 and processing is performed while communicating encoded modulated image data and modulation information in substantially real-time. The imaging system 10, however, may include a storage device (e.g., a hard disk drive) that stores encoded modulated image data and modulation information, and the processing may be performed in non-real-time, instead.

The reception circuit 105, the received data decoding circuit 106, the color image generation circuit 107, and the output interface device 108 of the image generation apparatus 12 illustrated in FIG. 1 will be described hereinafter.

Reception Circuit 105

The reception circuit 105 receives encoded modulated image data and modulation information output from the imaging apparatus 11. Wired communication or wireless communication may be employed between the reception circuit 105 and the transmission circuit 104. Even if the transmission circuit 104 transmits encoded modulated image data and modulation information through wired communication, the reception circuit 105 may receive the encoded modulated image data and the modulation information through wireless communication using a device that connects wired communication and wireless communication. The same holds for an opposite case.

Received Data Decoding Circuit 106

The received data decoding circuit 106 decodes encoded modulated image data to obtain a modulated image. Details of the received data decoding circuit 106 will be described later.

Color Image Generation Circuit 107

The color image generation circuit 107 receives a modulated image obtained by decoding encoded modulated image data using the received data decoding circuit 106 and then generates a color image using modulation information obtained by the reception circuit 105. Details of a process for generating a color image will be described later. The color image generation circuit 107 transmits the generated color image to the output interface device 108.

Output Interface Device 108

The output interface device 108 is an image output terminal. The output interface device 108 outputs a color image to an outside of the image generation apparatus 12 as a digital signal or an analog signal.

Next, the color filter 202 illustrated in FIG. 2 will be described in more detail with reference to FIGS. 3 to 5.

Figure 3:
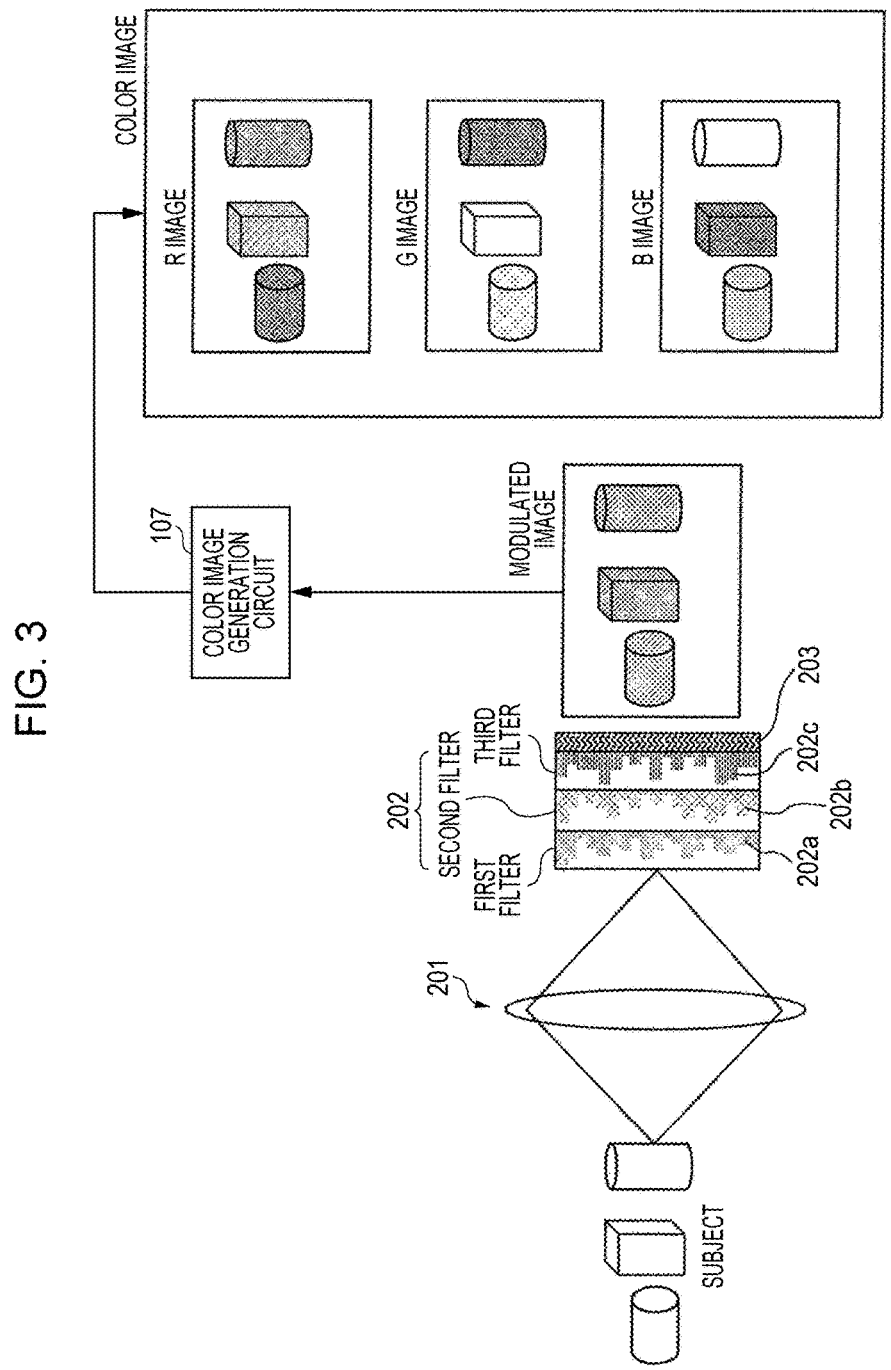
FIG. 3 is a schematic diagram illustrating the imaging apparatus including a color filter according to the embodiment.

FIG. 3 schematically illustrates the imaging system 10 including the color filter 202. The color filter 202 will be described hereinafter.

As described above, the color filter 202 includes positions corresponding to the pixels of the imaging device 203 and different optical transmittances for the wavelength ranges. That is, a certain position at which light in a plurality of wavelength ranges passes through has a combination of a plurality of transmittances (transmittance pattern) for the plurality of wavelength ranges different from a transmittance pattern at another position.

In order to achieve such optical characteristics, the color filter 202 according to the present embodiment includes first to third filters of different types defining optical passbands, and thicknesses of the first to third filters differ depending on the position. The "thicknesses of the filters" refer to lengths of cut films (described later) of the filters in a direction of an optical axis of passing light.

Although FIG. 3 illustrates the first to third filters, this is just an example. The number of filters used is not limited to three.

The first filter includes a cut film 202a, the second filter includes a cut film 202b, and the third filter includes a cut film 202c. The cut films 202a to 202c each include a plurality of cut film layers stacked on one another, each of which has a certain absorption index. Other example of color filter 202 is chromatic material formed directly on imaging element 203. The example of chromatic material is organic dye, inorganic compound including the oxidation silicon and titanium oxide, and organic pigment. In this case, a thickness of color filter 202 is equivalent to a thickness of chromatic material on imaging element 203.

Figure 4:
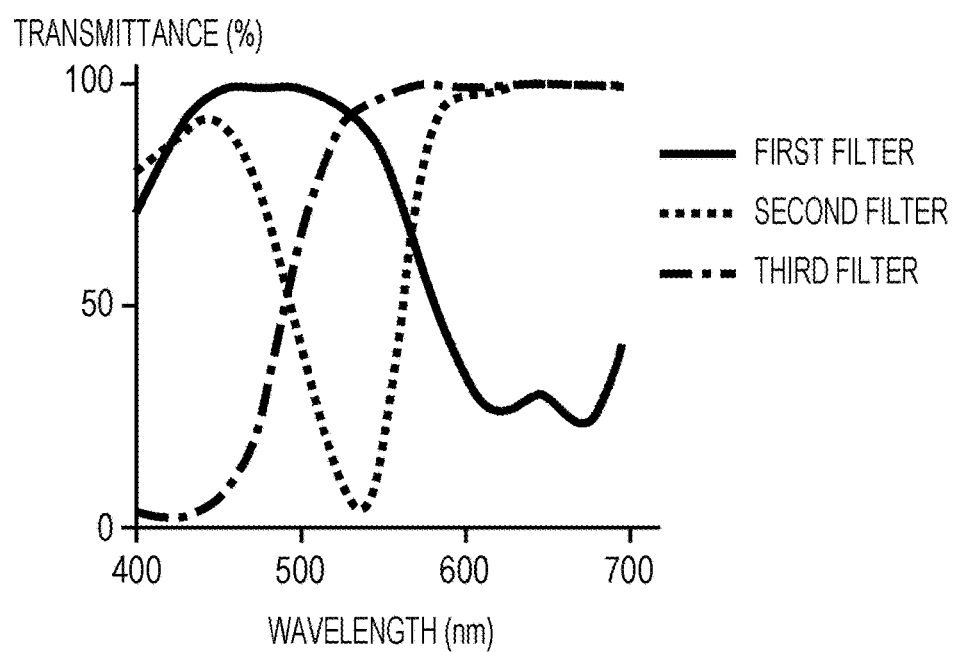
FIG. 4 is a schematic diagram illustrating transmittances of three filters according to the embodiment.

FIG. 4 illustrates transmittances, which are a part of wavelength characteristics of the first to third filters. The wavelength characteristics of the filters (first to third filters) indicate how much of light incident on the filters is reflected, transmitted, or absorbed. Wavelength characteristics of the cut films (cut films 202a to 202c) also indicate how much of light incident on the cut films is reflected, transmitted, or absorbed.

The sum of reflected light, transmitted light, and absorbed light equals incident light. A ratio of reflected light to incident light is called "reflectance", a ratio of transmitted light to incident light is called "transmittance", and a ratio of absorbed light to incident light is called "absorptance". The reflectance does not basically change in accordance with the thickness of a filter. The absorptance can also be calculated by subtracting the amount of reflected light and the amount of transmitted light from the amount of incident light and dividing the remainder by the amount of incident light.

FIG. 4 illustrates relationships between the transmittance and the wavelength. In addition, as described later, the wavelength characteristics of the first to third filters included in the color filter 202 are transmittances independent of the thickness of the filter at a given wavelength, that is, an absorptance of 0%.

For example, the absorptance of the first filter is 0% around a wavelength of 450 nm, the absorptance of the second filter is 0% around a wavelength of 580 nm, and the absorptance of the third filter is 0% around a wavelength of 640 nm. That is, as illustrated in FIG. 4, the transmittance of the first filter is 100% around the wavelength of 450 nm, the transmittance of the second filter is 100% around the wavelength of 580 nm, and the transmittance of the third filter is 100% around the wavelength of 640 nm.

It is to be noted that the absorptance of 0% is ideal, and the absorptance need not be exactly 0%. Even in the case of an absorptance of several percent, the cut films 202a to 202c achieve functions thereof. Insofar as the absorptance is within a range of 0% to 2%, for example, the absorptance can be regarded as 0% in practice. Similarly, the transmittance of 100% is ideal, and insofar as the transmittance is within a range of 98% to 100%, the transmittance can be regarded as 100% in practice.

As illustrated in FIG. 3, the first to third filters are stacked on one another. An optical member that does not essentially affect the transmittance or the absorptance at transmission wavelengths may be applied to a portion of the third filter, for example, in which the cut film 202c does not exist, in order to support the second filter, which is stacked on the third filter. The same holds for the first and second filters. Optical characteristics of the cut films 202a to 202c, therefore, determine optical characteristics of the first to third filters.

A transmittance $x(\lambda, u, v)$ of a pixel $(u, v)$ at a wavelength $\lambda$ is represented as follows on the basis of the configuration of the first to third filters.

$$x(\lambda,u,v)=\Phi(C1(\lambda),T1(u,v))\cdot\Phi(C2(\lambda),T2(u,v))\cdot\Phi(C3(\lambda),T3(u,v)) \quad (1)$$

Here, $C1(\lambda)$ denotes a wavelength characteristic of one cut film layer included in the cut film 202a at the wavelength λ. C2(λ) denotes a wavelength characteristic of one cut film layer included in the cut film 202b at the wavelength λ. C3(λ) denotes a wavelength characteristic of one cut film layer included in the cut film 202c at the wavelength λ.

T1(u, v) denotes the thickness (the number of layers stacked) of the cut film 202a at a position corresponding to the pixel (u, v). T2(u, v) denotes the thickness (the number of layers stacked) of the cut film 202b at the position corresponding to the pixel (u, v). T3(u, v) denotes the thickness (the number of layers stacked) of the cut film 202c at the position corresponding to the pixel (u, v). The thickness (the number of layers stacked) of a cut film will be referred to as the "thickness of a filter" in order to simplify the description.

Φ(C(λ), T(u, v)) is a function indicating the transmittance of a filter at the wavelength λ. This function indicates a transmittance determined from the wavelength characteristic C(λ) of a filter (one cut film layer) with unit thickness and the thickness T(u, v) of the filter.

In addition, Φ((C(λ), T(u, v)) is a function that exhibits a fixed value when the absorptance included in C(λ) is 0 or when T(u, v) is 0. The transmittance usually decreases as a filter becomes thicker. When the absorptance of a filter is 0, however, the transmittance of the filter is a fixed value regardless of the thickness of the filter. When a filter is not provided (T(u, v)=0), too, the transmittance of a filter is a fixed value regardless of a wavelength characteristic of the filter with unit thickness.

The transmittance at each wavelength is determined as above. The transmittance in each wavelength range is determined on the basis of a plurality of transmittances at a plurality of wavelengths in the wavelength range. An average of a plurality of transmittances at a plurality of wavelengths in a wavelength range, for example, may be regarded as a transmittance in the wavelength range. The average may be a simple average or a weighted average.

More specifically, a transmittance TR(u, v) for the pixel (u, v) in terms of R, a transmittance TG(u, v) for the pixel (u, v) in terms of G, and a transmittance TB(u, v) for the pixel (u, v) in terms of B can be represented as follows.

$$TR(u,v)=\int x(\lambda,u,v)\cdot R(\lambda)d\lambda$$

$$TG(u,v)=\int x(\lambda,u,v)\cdot G(\lambda)d\lambda$$

$$TB(u,v)=\int x(\lambda,u,v)\cdot B(\lambda)d\lambda \quad (2)$$

In expression (2), R(λ) corresponds to a sensitivity to R at the wavelength λ, G(λ) corresponds to a sensitivity to G at the wavelength λ, and B(λ) corresponds to a sensitivity to B at the wavelength λ. More specifically, R(λ) exhibits a positive value at a wavelength λ in a wavelength range of R and 0 at a wavelength λ outside the wavelength range of R. Similarly, G(λ) exhibits a positive value at a wavelength λ in a wavelength range of G and 0 at a wavelength λ outside the wavelength range of G. B(λ) exhibits a positive value at a wavelength λ in a wavelength range of B and 0 at a wavelength λ outside the wavelength range of B.

By changing the thicknesses of the first to third filters for each pixel in accordance with the above-described relationships, the color filter 202 whose transmittance in a wavelength range differs depending on the pixel of the imaging device 203 is achieved.

In particular, a correlation coefficient between a transmittance in each wavelength range at one of the plurality of positions in the color filter 202 corresponding to the plurality of pixels and a transmittance in the wavelength range at another position is larger than -1 but smaller than 1. For example, correlation coefficients between a transmittance in each wavelength range at a position and transmittances in the wavelength range at all the other positions are larger than -1 but smaller than 1. Otherwise, a transmittance in each wavelength range at a position and a transmittance in the wavelength range at another position do not have a correlation. That is, a correlation coefficient between a transmittance in each wavelength range at a position and a transmittance in the wavelength range at another position is approximately -0.2 to 0.2.

In addition, the color filter 202 is configured such that the sum of the transmittance TR(u, v) for the pixel (u, v) in terms of R, the transmittance TG(u, v) for the pixel (u, v) in terms of G, and the transmittance TB(u, v) for the pixel (u, v) in terms of B becomes the same between all the pixels (u, v).

Figure 5:
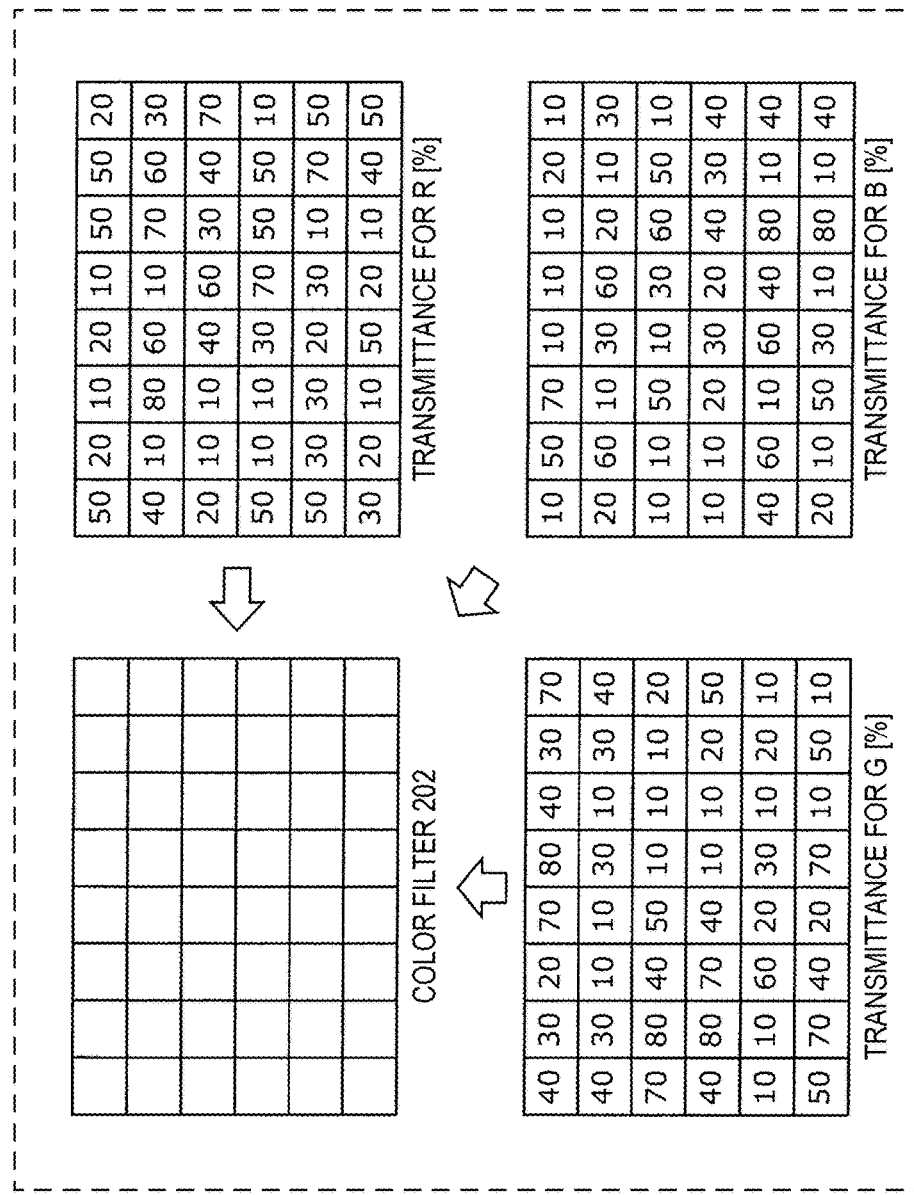
FIG. 5 is a schematic diagram illustrating the color filters according to the embodiment.

FIG. 5 is a schematic diagram illustrating the color filter 202. In FIG. 5, the transmittances for R, G, and B are indicated in percentage, and the sum of the transmittances for R, G, and B is 100% in every pixel. That is, a relationship represented by the following expression is satisfied in every pixel.

$$TR(u,v)+TG(u,v)+TB(u,v)=1 \quad (3)$$

In this case, a signal level of an original optical signal (that is, an optical signal when the color filter 202 is not provided) is about three times as high as a signal level of an optical signal obtained through the color filter 202 in every pixel. In other words, the signal level of an optical signal obtained through the color filter 202 is estimated to be in accordance with the signal level of an original optical signal in every pixel. In addition, signal levels of original optical signals are assumed to be similar to each other between neighboring pixels.

The imaging apparatus 11, therefore, can compress data on the basis of the similarity of signal levels between neighboring pixels.

In addition, for example, the plurality of transmittances of the color filter 202 for the plurality of pixels and the plurality of wavelength ranges may be based on uniform distribution (uniform random numbers) within a range of 0% to 100%. The plurality of transmittances based on uniform distribution may then be adjusted in such a way as to satisfy the above expression. More specifically, the plurality of transmittances provided for the plurality of wavelength ranges on the basis of uniform distribution may be adjusted for each pixel through scaling such that the sum of the plurality of transmittances becomes 1 (100%).

In a Bayer pattern described in U.S. Pat. No. 5,629,734 or in a random filter pattern described in Japanese Unexamined Patent Application Publication (Translation of PCT Application) No. 2013-511924, transmittances of R pixels, G pixels, and B pixels are the same. Even in the random filter pattern described in Japanese Unexamined Patent Application Publication (Translation of PCT Application) No. 2013-511924, for example, transmittances in the wavelength ranges of transmitted light are the same. On the other hand, by configuring the color filter 202 in the above-described manner, the imaging apparatus 11 can achieve random sampling based on uniform random numbers in each wavelength range not only with respect to a position of the sampling but also with respect to the intensity of the sampling.

The distribution of the transmittances of the color filter 202 is obviously not limited to uniform distribution (uniform random numbers). The distribution of the transmittances of the color filter 202 may be based on normal distribution (Gaussian distribution) in which an average of the transmittances is 50%, instead. In this case, the imaging apparatus 11 can achieve random sampling based on the normal random numbers in each wavelength range.

In the above description, an example has been described in which the sum of the three transmittances for R, G, and B is 1 (100%) in every pixel. The color filter 202, however, may be configured such that an average of the three transmittances becomes 50% and the sum of the three transmittances becomes 1.5 (150%), instead. For example, the plurality of transmittances provided for the plurality of wavelength ranges on the basis of normal distribution may be adjusted for each pixel through scaling such that the sum of the plurality of transmittances becomes 1.5 (150%) while maintaining the ratio.

In addition, in order to use light efficiently, the sum of the three transmittances for R, G, and B may be a larger value.

In addition, the color filter 202 need not be configured such that the thicknesses of the first to third filters change depending on the pixel. For example, the color filter 202 may be achieved using a liquid crystal or a spatial light modulator. The spatial light modulator is an optical device that modulates transmittance spatially and temporally, and capable of changing transmittance for each pixel.

Next, the transmission data compression circuit 103 and the transmission circuit 104 illustrated in FIG. 2 will be described in more detail with reference to FIGS. 6 to 8.

Figure 6:
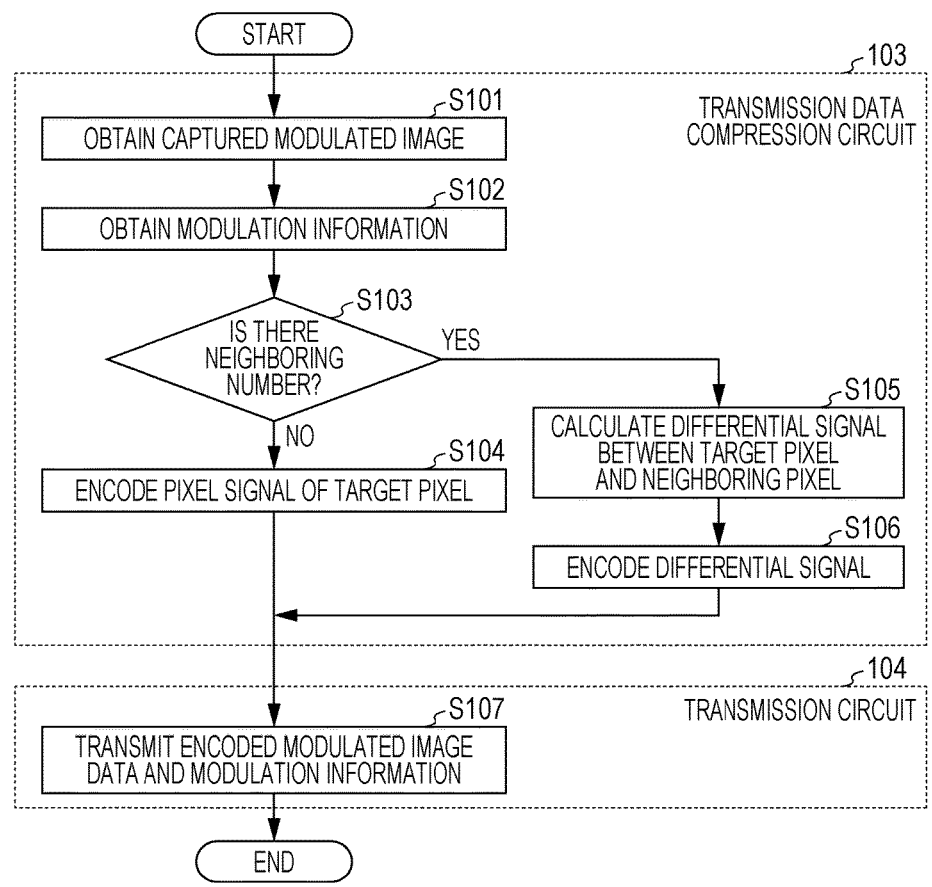
FIG. 6 is a flowchart illustrating a procedure of a process performed by a transmission data compression circuit according to the embodiment.

FIG. 6 is a flowchart illustrating a procedure of a process performed by the transmission data compression circuit 103 and the transmission circuit 104 according to the present embodiment.

The transmission data compression circuit 103 obtains a modulated image captured by the imaging device 203 (step S101).

The transmission data compression circuit 103 also obtains modulation information indicating a plurality of transmittances of the color filter 202 used by the imaging device 203 to capture the modulated image (step S102). The transmission data compression circuit 103 outputs the obtained modulation information to the transmission circuit 104. The transmission data compression circuit 103 does not use the modulation information to compress the modulated image. If the transmission circuit 104 obtains the modulation information without using the transmission data compression circuit 103, therefore, the transmission data compression circuit 103 need not obtain modulation information.

Next, the transmission data compression circuit 103 selects a neighboring pixel in order to select a method for compressing transmission data. Here, the transmission data compression circuit 103 compresses a pixel signal of each pixel in raster scan order. The pixel signal is also called a "pixel value", and corresponds to a signal level obtained by each pixel.

Figures 7, 8:
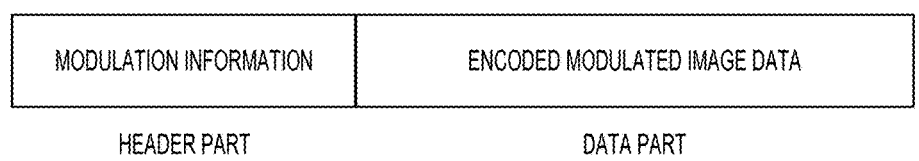
FIG. 7 is a schematic diagram illustrating a process for compressing a modulated image in each pixel in raster scan order.
FIG. 8 is a schematic diagram illustrating an example of a transmission format for transmitting modulation information and encoded modulated image data according to the embodiment.

FIG. 7 is a schematic diagram illustrating a process for compressing a pixel signal of each pixel in raster scan order. That is, in FIG. 7, the transmission data compression circuit 103 compresses pixel signals at (u, v)=(1, 1), (2, 1), and (3, 1) in this order, and then compresses a pixel signal at (4, 4). In this case, the transmission data compression circuit 103 selects a pixel to the left of a target pixel as a neighboring pixel.

If there is no neighboring pixel (NO in step S103), that is, if the transmission data compression circuit 103 compresses a pixel signal of a target pixel located at a left end (u=1) of the modulated image, the transmission data compression circuit 103 compresses the pixel signal by encoding the pixel signal itself of the modulated image (step S104). More specifically, the transmission data compression circuit 103 may encode the pixel signal through entropy coding or Huffman coding. A target signal d(u, v) of the modulated image to be encoded is represented as follows using a pixel signal y(u, v) of the target pixel in the modulated image.

$$d(u,v)=y(u,v) \quad (4)$$

On the other hand, if there is a neighboring pixel (YES in step S103), that is, if the transmission data compression circuit 103 compresses a pixel signal of a target pixel that is not located at the left end (u=1) of the modulated image, the transmission data compression circuit 103 calculates a differential signal between the target pixel and the neighboring pixel (step S105). The transmission data compression circuit 103 then compresses the pixel signal of the target pixel by encoding the differential signal through entropy coding or Huffman coding (step S106). That is, the transmission data compression circuit 103 performs differential compression on the modulated image.

In step S105, the target signal d(u, v) to be encoded, which is the differential signal between the target pixel and the neighboring pixel, is calculated, for example, as follows.

$$d(u,v)=y(u,v)-y(u-1,v) \quad (5)$$

The transmission data compression circuit 103 repeats the above process (steps S103 to S106) to compress and encode pixel signals of all the pixels in the modulated image and, as a result, compress and encode the modulated image.

The transmission data compression circuit 103 can perform the compression by calculating a difference between a target pixel and a neighboring pixel. It is known that, in a natural image, adjacent pixels have a significantly high correlation. In addition, in the present embodiment, the sum of a plurality of optical transmittances of the color filter 202 for each pixel in a plurality of wavelength ranges is the same between all the pixels. The correlation between adjacent pixels, therefore, is maintained to some degree. The transmission data compression circuit 103 can thus perform efficient compression.

The transmission circuit 104 transmits encoded modulated image data, which is obtained by compressing the modulated image using the transmission data compression circuit 103, and the modulation information to the image generation apparatus 12 (step S107).

FIG. 8 is a schematic diagram illustrating an example of a transmission format for transmitting modulation information and encoded modulated image data. For example, the modulation information is described in a header part of transmission data, and the encoded modulated image data is described in a data part of the transmission data.

When encrypting the transmission data using the transmission format illustrated in FIG. 8 and transmitting the transmission data, the transmission circuit 104 may encrypt not the entirety of the transmission data but only the modulation information in the header part of the transmission data. As described later, the modulation information is used in a restoration process according to the present embodiment. The transmission circuit 104, therefore, can encrypt the transmission data while suppressing a calculation load by encrypting only the modulation information in the header part of the transmission data.

Next, the image generation apparatus 12 illustrated in FIG. 1 will be described in more detail with reference to FIGS. 9 to 11.

Figure 9:
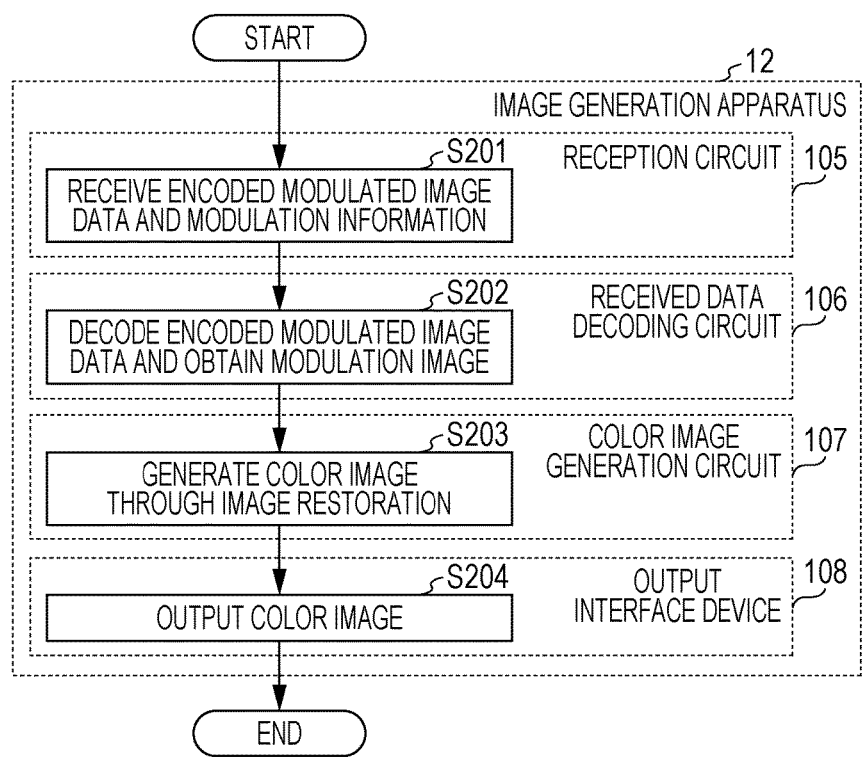
FIG. 9 is a flowchart illustrating a procedure of a main process performed by the image generation apparatus according to the embodiment.

FIG. 9 is a flowchart illustrating a procedure of a main process performed by the image generation apparatus 12. The reception circuit 105 of the image generation apparatus 12 receives encoded modulated image data and modulation information transmitted from the transmission circuit 104 of the imaging apparatus 11 (step S201). The communication is performed through a wireless or wired communication line (network).

The received data decoding circuit 106 decodes the encoded modulated image data received by the reception circuit 105 to obtain a modulated image (step S202). The color image generation circuit 107 generates a color image from the modulated image and the modulation information using an image restoration technique (e.g., a compressed sensing technique) (step S203). The output interface device 108 outputs the color image generated by the color image generation circuit 107 in order to display the color image or use the color image for image processing such as person detection (step S204).

The process performed by the received data decoding circuit 106 and the color image generation circuit 107 will be described in more detail hereinafter.

Figure 10:
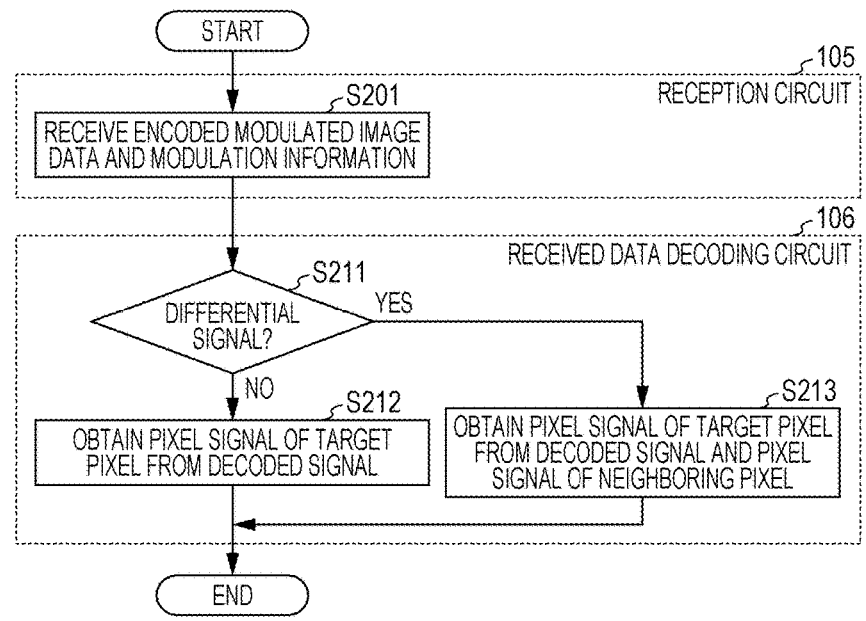
FIG. 10 is a flowchart illustrating a procedure of a process performed by a reception circuit and a received data decoding circuit according to the embodiment.

FIG. 10 is a flowchart illustrating a procedure of a process performed by the reception circuit 105 and the received data decoding circuit 106 according to the present embodiment.

The reception circuit 105 receives encoded modulated image data and modulation information transmitted from the transmission circuit 104 (step S201).

The received data decoding circuit 106, first, decompresses the encoded modulated image data by decoding encoded signals included in the encoded modulated image data through entropy decoding or Huffman decoding. As a result, the received data decoding circuit 106 obtains decoded signals corresponding to the encoded signals. The received data decoding circuit 106 then determines whether each of the decoded signals is a pixel signal of a target pixel or a differential signal between a target pixel and a neighboring pixel (step S211). At this time, the received data decoding circuit 106 determines whether the target pixel is located at the left end (u=1) of the image.

If the target pixel is located at the left end of the image, that is, if the decoded signal is not a differential signal but a pixel signal of the target pixel (NO in step S211), the received data decoding circuit 106 obtains a pixel signal y(u, v) of the target pixel in the modulated image from the decoded signal d(u, v) (step S212). More specifically, the pixel signal y(u, v) of the target pixel in the modulated image is calculated as follows.

$$y(u,v)=d(u,v) \quad (6)$$

On the other hand, if the decoded signal is a differential signal (YES in step S211), the received data decoding circuit 106 obtains a pixel signal y(u, v) of the target pixel in the modulated image from the decoded signal d(u, v) and a pixel signal y(u−1, v) of the neighboring pixel (step S213). More specifically, the received data decoding circuit 106 decompresses the encoded modulated image data (differentially compressed) by calculating the pixel signal y(u, v) of the target pixel in the modulated image as follows.

$$y(u,v)=d(u,v)+y(u-1,v) \quad (7)$$

The received data decoding circuit 106 repeats the above process (steps S211 to S213) to obtain pixel signals of all the pixels in the modulated image and, as a result, obtain the modulated image.

Next, a process performed by the color image generation circuit 107 will be described. A process for generating a color image is represented as follows when a captured modulated image is denoted by y and an image to be generated, which is a color RGB image, is denoted by x.

$$y=Ax \quad (8)$$

Here, a matrix A is a sampling matrix determined by modulation information. The sampling matrix A indicates a relationship between the modulated image y and the image to be generated x. When the number of pixels is N, for example, the modulated image y is represented by a matrix of N×1, the image to be generated x is represented by a matrix of 3N×1, and the sampling matrix A is represented by a matrix of N×3N.

A method for obtaining the sampling matrix A will be described hereinafter. Here, a method employing color calibration based on the Macbeth ColorChecker will be described. The Macbeth ColorChecker is a chart including 24 color samples. In the Macbeth ColorChecker, XYZ values and sRGB values are defined for each color sample.

The sRGB values of each color sample j (j=1, 2, 3, ..., and 24), for example, are denoted by R'(j), G'(j), and B'(j), respectively. By capturing an image of each color sample j using the imaging apparatus 11 according to the present embodiment, a pixel signal I(j, i) of a modulated image is obtained by each pixel i (i=1, 2, 3, ..., and N). In this case, the following expression is established.

$$c(1,i) \cdot R(j)+c(2,i) \cdot G(j)+c(3,i) \cdot B(j)=I(j,i) \quad (9)$$

Here, c(x, i) (x=1, 2, and 3) is an element of the sampling matrix A in an i-th row and a (3(i−1)+x)-th column. Elements of the sampling matrix A other than in the i-th row and the (3(i−1)+x)-th column are 0. R(j), G(j), and B(j) are obtained by linearly transforming R'(j), G'(j), and B'(j), respectively. More specifically, R(j), G(j), and B(j) are obtained through the following calculation.

$$R(j)=\{(R'(j)/255+0.055)/1.055\}^{2.4} \times 255$$

$$G(j)=\{(G'(j)/255+0.055)/1.055\}^{2.4} \times 255$$

$$B(j)=\{(B'(j)/255+0.055)/1.055\}^{2.4} \times 255 \quad (10)$$

From the relationship represented by expression (9), 24 equations are obtained for the three unknowns c(1, i), c(2, i), and c(3, i). The unknowns c(1, i), c(2, i), and c(3, i), therefore, can be obtained using the method of least squares. By performing this process on all the pixels i, the sampling matrix A is obtained.

Next, a method for obtaining the image to be generated x from the sampling matrix A and the modulated image y will be described. In order to simplify the description, a case will be described in which the number N of pixels of the imaging device 203 is 16.

FIGS. 11A to 11D are schematic diagrams illustrating a modulated image and generated images when the number N of pixels of the imaging device 203 is 16. In FIGS. 11A to 11D, 16 pixels defined by u=1 to 4 and v=1 to 4 are illustrated. In addition, (a) indicates the modulated image, (b) indicates a generated R image, which is an R channel of the generated color image, (c) indicates a generated G image, which is a G channel of the generated color image, and (d) indicates a generated B image, which is a B channel of the generated color image. In the example illustrated in, FIGS. 11A to 11D y and x in expression (8) are represented as follows.

$$y=[y_{1,1}, y_{2,1}, y_{3,1} \ldots y_{4,4}]^T$$

$$x=[r_{1,1} g_{1,1} b_{1,1} r_{2,1} g_{2,1} b_{2,1} r_{3,1} g_{3,1} b_{3,1} \ldots r_{4,4} g_{4,4} b_{4,4}]^T \quad (11)$$

As seen from expression (11), the number of elements of x, which is an unknown, is 48, and the number of elements of y, which is an observed quantity, is 16. That is, the number of equations is too small for the unknown. Expression (8), therefore, is an ill-posed problem.

The imaging system 10 uses a compressed sensing technique to solve the ill-posed problem. The compressed sensing technique is a technique in which data is compressed by performing an addition process (encoding) at a time of sensing of a signal and then an original signal is obtained through decoding by performing a restoration process using the compressed data. In the compressed sensing process, prior knowledge is used to solve an ill-posed problem.

As the prior knowledge about a natural image, total variation, which is the sum of absolute values of differences in luminance between neighboring positions in an image, may be used (e.g., L. I. Rudin, S. J. Osher, and E. Fatemi, "Nonlinear Total Variation Based Noise Removal Algorithms", Physica D, vol. 60, pp. 259-268, 1992 and S. Ono and I. Yamada, "Decorrelated Vectorial Total Variation", IEEE Conference on Computer Vision and Pattern Recognition, 2014). Alternatively, the sparseness of a linear transform such as a wavelet transform, a discrete cosine transform (DCT), or a curvelet transform, that is, a fact that many coefficients become 0 as a result of these transforms, may be used (e.g., J. Ma, "Improved Iterative Curvelet Thresholding for Compressed Sensing and Measurement", IEEE Transactions on Instrumentation & Measurement, vol. 60, no. 1, pp. 126-136, 2011).

Alternatively, dictionary learning, in which transform coefficients in the above linear transforms are obtained through learning, may be used (e.g., M. Aharon, M. Elad, and A. M. Bruckstein, "K-SVD: An Algorithm for Designing Overcomplete Dictionaries for Sparse Representation", IEEE Transactions on Image Processing, vol. 54, no. 11, pp. 4311-4322, 2006).

Here, decorrelated vectorial total variation, which is a method classified as a type of total variation, will be described. In this method, generation of an artifact called "false color" is suppressed by separately calculating gradients of a luminance component and a color difference component of a color image. This is achieved by minimizing the following evaluation function.

$$\arg\min_{x \in [0,255]^{3 \times N}} J(x) + \|Ax - y\|_2^2 \quad (12)$$

The evaluation function is composed of the following three terms.

1. Data fidelity term ($\|Ax-y\|^2_2$): A constraint term for satisfying expression (8).

2. Dynamic range term ($[0,255]^{3 \times N}$; a range of x for calculating a minimum value min): A constraint term for limiting a pixel value to a range of 0 to 255.

3. Decorrelated vectorial total variation term (J(x)): A total variation term in which gradients of a luminance component and a color difference component of a color image are separated from each other.

Here, $\|Ax-y\|^2_2$ denotes the sum of squares (L2 norm) of (Ax-y). In addition, J(x) corresponds to differences between neighboring pixels in terms of the luminance component and the color difference component in the entirety of the image and is represented by expressions (13) to (17). In expressions (13) to (17), R denotes a real number, and R+ denotes a nonnegative real number.

$$J: R^{3N} \to R_+ : x \mapsto \|DCx\|_{1,2}^{(w,2,4)} \quad (13)$$

$$x = [x_R^T \ x_G^T \ x_B^T]^T \in R^{3N} \quad (14)$$

(orthogonal color transformation)

$$C: R^{3N} \to R^{3N} : x \mapsto [x_1 \ x_2 \ x_3]$$

$$x_1 = \frac{1}{\sqrt{3}}(x_R + x_G + x_B), x_2 = \frac{1}{\sqrt{2}}(x_R - x_B), x_3 = \frac{1}{\sqrt{6}}(x_R - 2x_G + x_B) \quad (15)$$

(linear gradient operator in color image)

$$D = \text{diag}[D_1 \ D_1 \ D_1] \in R^{6N \times 3N}$$

(linear gradient operator in each channel)

$$D_1 = [D_v^T \ D_h^T]^T \in R^{2N \times N}$$

(vertical/horizontal linear gradient operator)(Neumann boundary)

$$D_v, D_h \in R^{N \times N}$$

$$\|\cdot\|_{1,2}^{(w,k_1,k_2)}: R^{(k_1+k_2)N} \to R_+ : x \mapsto w\|x_1\|_{1,2}^{(k_1)} + \|x_2\|_{1,2}^{(k_2)} \quad (16)$$

$$x = [x_1^T \ x_2^T]^T, x_1 \in R^{k_1 N}, x_2 \in R^{k_2 N}$$

$$w \in (0, 1)$$

$$\|\cdot\|_{1,2}^{(k)}: R^{kN} \to R_+ : x \mapsto \sum_{i=1}^{N} \sqrt{\sum_{j=0}^{k-1} m_{i+jN}^2} \quad (m_i \text{ is i-th element of } x) \quad (17)$$

FIGS. 12A to 14D illustrate an example of color images generated for each color by the color image generation circuit 107 according to the present embodiment. FIGS. 12A to 12D illustrate R images, FIGS. 13A to 13D illustrate G images, and FIGS. 14A to 14D illustrate B images. The present inventors actually generated color images and compared the color images with one another, but in FIGS. 12A to 14D, each image is binarized through error diffusion on the basis of the luminance of the image.

Figure 12A:
FIGS. 12A to 12D are diagrams illustrating R channel images corresponding to an example of a color image generated by a color image generation unit according to the embodiment.
Figure 12B:
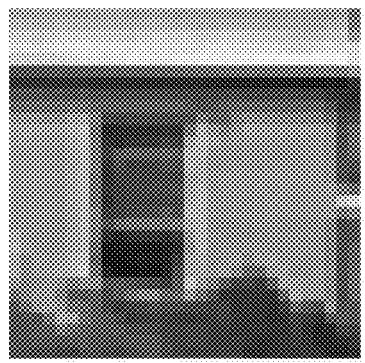
Figure 13A:
FIGS. 13A to 13D are diagrams illustrating G channel images corresponding to the example of the color image generated by the color image generation unit according to the embodiment.
Figure 13B:
Figure 14A:
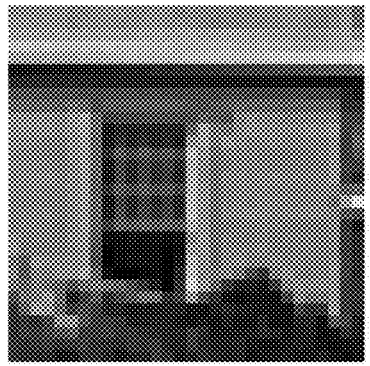
FIGS. 14A to 14D are diagrams illustrating B channel images corresponding to the example of the color image generated by the color image generation unit according to the embodiment.
Figure 14B:
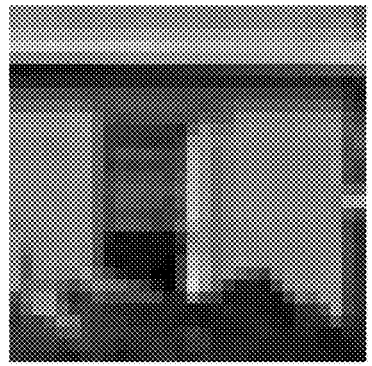

FIGS. 12A, 13A, and 14A each indicate a correct color image captured by a three-charge-coupled-device (CCD) camera. FIGS. 12B, 13B, and 14B each indicate an image demosaiced through adaptive color plane interpolation (ACPI), which is a common demosaicing method described in U.S. Pat. No. 5,629,734.

Figure 12C:
Figure 12D:
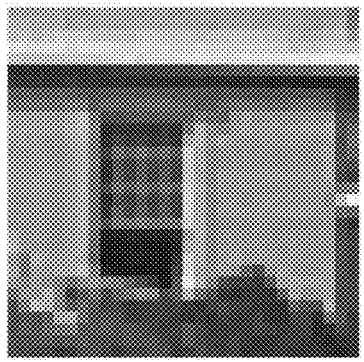
Figure 13C:
Figure 13D:
Figure 14C:
Figure 14D:
Figure 15A:
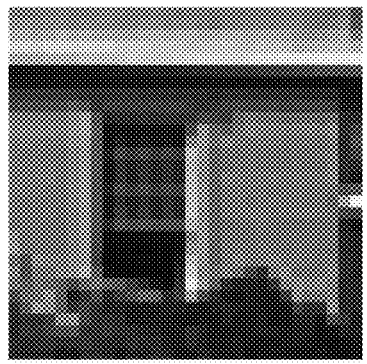
FIGS. 15A to 15D are diagrams illustrating an example of color images generated by the color image generation unit according to the embodiment.
Figure 15B:
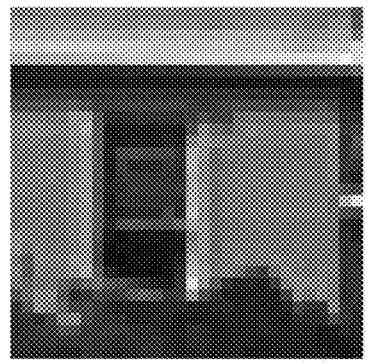
Figure 15C:
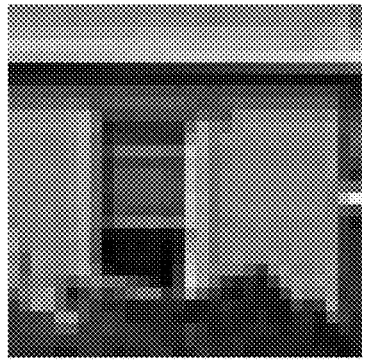
Figure 15D:

FIGS. 12C, 13C, and 14C each indicate an image demosaiced through minimized-Laplacian residual interpolation (MLRI), which is described in D. Kiku, Y. Monno, M. Tanaka, and M. Okutomi, "Minimized-Laplacian Residual Interpolation for Color Image Demosaicking", IS&T/SPIE Electronic Imaging, 2014. FIGS. 12D, 13D, and 14D each indicate an image restored by the color image generation circuit 107 according to the present embodiment.

Although FIGS. 12A to 14D will be referred to in the following description, the same holds for FIGS. 13A to 13D and FIGS. 14A to 14D.

Around the center of FIG. 12A, a window with a lattice is observed. In FIGS. 12B and 12C, a Bayer pattern in an example of the related art illustrated in FIG. 19 is used. The present inventors examined the image demosaiced through the ACPI illustrated in FIG. 12B and identified an artifact called "false color" around edges. More specifically, the present inventors actually found false color at edges of the window. The present inventors also observed that the restored image according to the present embodiment illustrated in FIG. 12D does not include false color.

In the image demosaiced through the MLRI illustrated in FIG. 12C, high-frequency components such as the lattice of the window are not sufficiently restored. On the other hand, the color image generation circuit 107 according to the present embodiment does not occur an artifact and can sufficiently restore high-frequency components compared to the techniques in the examples of the related art.

FIGS. 15A to 15D illustrate an example of color images including all the colors. More specifically, in FIGS. 15A to 15D, color images including all the colors are binarized through error diffusion on the basis of the luminance thereof. As seen from the lattice of the window, a reconstructed image according to the present embodiment is the most similar to a correct image.

As described above, the imaging system 10 according to the present embodiment can suppress an artifact and obtain a high-resolution color image by capturing an image using the color filter 202 and performing a process for generating a color image using a compressed sensing technique.

In the above example, the color filter 202 is configured such that the sum of the plurality of optical transmittances for each pixel in the plurality of wavelength ranges (R, G, and B) becomes the same between all the pixels (u, v). The color filter 202, however, may be configured such that the sum of products of an optical transmittance group relating to the plurality of optical transmittances for each pixel in the plurality of wavelength ranges (R, G, and B) and coefficients common to the plurality of pixels becomes the same between all the pixels (u, v), instead.

That is, the color filter 202 may be configured such that the sum of products of a certain wavelength characteristic and a wavelength characteristic of each pixel becomes the same between all the pixels. Here, the sum of products of a relative luminous efficiency and the wavelength characteristic of each pixel will be described.

Figure 16:
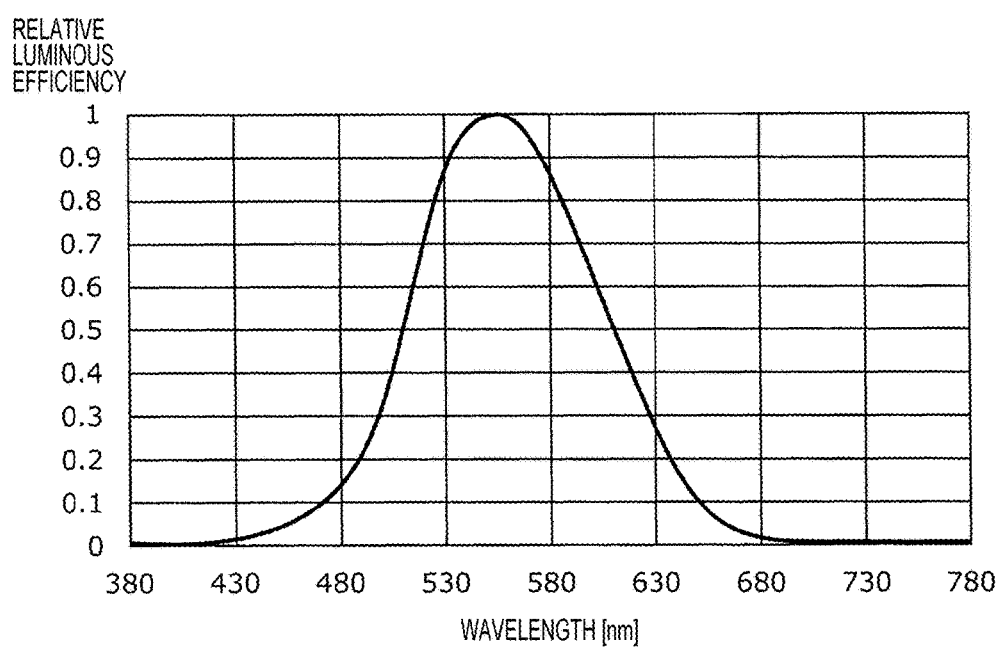
FIG. 16 is a schematic diagram illustrating a relative luminous efficiency curve corresponding to an intensity with which a human eye senses the brightness of light at given wavelengths.

FIG. 16 illustrates a relative luminous efficiency curve. The relative luminous efficiency indicates, with a value, an intensity with which a human eye senses the brightness of light at a given wavelength. Sensitivity to the brightness in each pixel is obtained by performing a product-sum operation on the wavelength characteristic of the pixel and the relative luminous efficiency. In the following example, the color filter 202 is configured such that the sum of products of the wavelength characteristic of each pixel and the relative luminous efficiency becomes the same between the plurality of pixels.

More specifically, the color filter 202 is configured such that the transmittance $x(\lambda, u, v)$ for the pixel (u, v) at the wavelength $\lambda$ and a relative luminous efficiency $F(\lambda)$ at the wavelength $\lambda$ satisfy expression (18).

$$\int x(\lambda,u,v) \cdot F(\lambda) d\lambda = p \tag{18}$$

In expression (18), p is a fixed value. As a result, the sensitivity of a person to brightness is equalized between the plurality of pixels. It is known that neighboring pixels have a high correlation of the brightness of a subject. By configuring the color filter 202 in such a way as to maintain the correlation, a decrease in the similarity of a pixel signal obtained by the imaging device 203 between neighboring pixels can be suppressed. The imaging apparatus 11, therefore, can appropriately compress a pixel signal by calculating a difference between neighboring (adjacent) pixels. Expression (19) may be used instead of expression (18).

$$\sum_\lambda x(\lambda, u, v) \cdot F(\lambda) = p \tag{19}$$

The relative luminous efficiency $F(\lambda)$ corresponds to the efficiencies common to the plurality of pixels. The transmittances in each wavelength range are determined on the basis of the transmittance $x(\lambda, u, v)$. The transmittance $x(\lambda, u, v)$, therefore, corresponds to the optical transmittance group relating the plurality of optical transmittances for each pixel in the plurality of wavelength ranges. That is, expressions (18) and (19) indicate that the sum of products of the optical transmittance group relating to the plurality of optical transmittances for each pixel in the plurality of wavelength ranges and the efficiencies common to the plurality of pixels is the same between the plurality of pixels.

Figure 17:
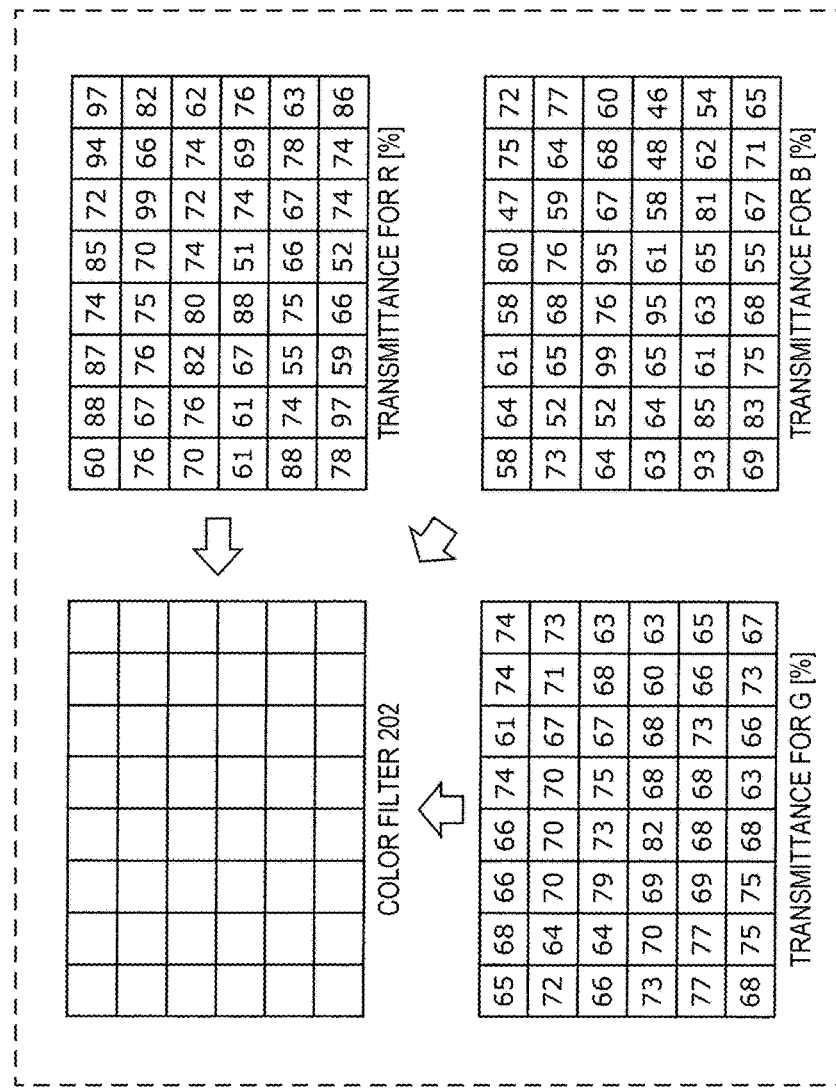
FIG. 17 is a schematic diagram illustrating a first modification of the color filter according to the embodiment.

FIG. 17 illustrates an example of the color filter 202 having transmittances based on the relative luminous efficiency. More specifically, a transmittance for R, a transmittance for G, and a transmittance for B are indicated for each pixel. For example, the color filter 202 has the transmittances $x(\lambda, u, v)$ that satisfy expression (18), and the transmittances of the color filter 202 for R, G, and B are defined by expression (2). FIG. 17 illustrates a result.

Alternatively, for example, the color filter 202 may be configured such that the sum of products of the three transmittances for each pixel in terms of R, G, and B and three coefficients corresponding to relative luminous efficiencies for R, G, and B becomes the same between the plurality of pixels. Three coefficients FR, FG, and FB corresponding to the relative luminous efficiencies for R, G, and B are obtained using expression (20).

$$FR = \int F(\lambda) \cdot R(\lambda) d\lambda$$

$$FG = \int F(\lambda) \cdot G(\lambda) d\lambda$$

$$FB = \int F(\lambda) \cdot B(\lambda) d\lambda \tag{20}$$

Here, $F(\lambda)$ denotes the relative luminous efficiency, $R(\lambda)$ denotes a sensitivity to R, $G(\lambda)$ denotes a sensitivity to G, and $B(\lambda)$ denotes a sensitivity to B. The color filter 202 may configured such that a transmittance TR(u, v) for R, a transmittance TG(u, v), and a transmittance TB(u, v) for B and the three coefficients FR, FG, and FB satisfy the following relationship in the pixel (u, v).

$$FR \cdot TR(u,v) + FG \cdot TG(u,v) + FB \cdot TB(u,v) = p \tag{21}$$

In expression (21), p is a fixed value. Expression (21) indicates that the sum of products of the three transmittances for the three wavelength ranges and the three coefficients indicating the relative luminous efficiencies of the three wavelength ranges is the same between the plurality of pixels.

Alternatively, the color filter 202 may be configured such that the sum of products of the plurality of transmittances for each pixel in the plurality of wavelength ranges and a plurality of luminance conversion coefficients in the plurality of wavelength ranges becomes the same between the plurality of pixels. The plurality of luminance conversion coefficients are determined to convert a plurality of signal levels corresponding to the plurality of wavelength ranges into luminances.

More specifically, 0.2126, 0.7152, and 0.0722 are determined as the three luminance conversion coefficients for R, G, and B, respectively. A luminance Y, for example, is obtained from three signal levels LR, LG, and LB for R, G, and B, respectively, on the basis of expression (22).

$$Y = 0.2126 \cdot LR + 0.7152 \cdot LG + 0.0722 \cdot LB \tag{22}$$

The color filter 202 may be configured such that the sum of products of the three transmittances for each pixel in terms of R, G, and B and the three luminance conversion coefficients for R, G, and B becomes the same between the plurality of pixels, instead. More specifically, the color filter 202 may be configured such that the transmittance TR(u, v) for R, the transmittance TG(u, v) for G, and the transmittance TB(u, v) for B and the three luminance conversion coefficients YR, YG, and YB satisfy the following relationship in the pixel (u, v).

$$YR \cdot TR(u,v) + YG \cdot TG(u,v) + YB \cdot TB(u,v) = p \quad (23)$$

YR=0.2126
YG=0.7152
YB=0.0722

In expression (23), p is a fixed value. Expression (23) indicates that the sum of products of the plurality of transmittances for each pixel in the plurality of wavelength ranges and the plurality of luminance conversion coefficients of the plurality of wavelength ranges is the same between the plurality of pixels.

Figure 18:
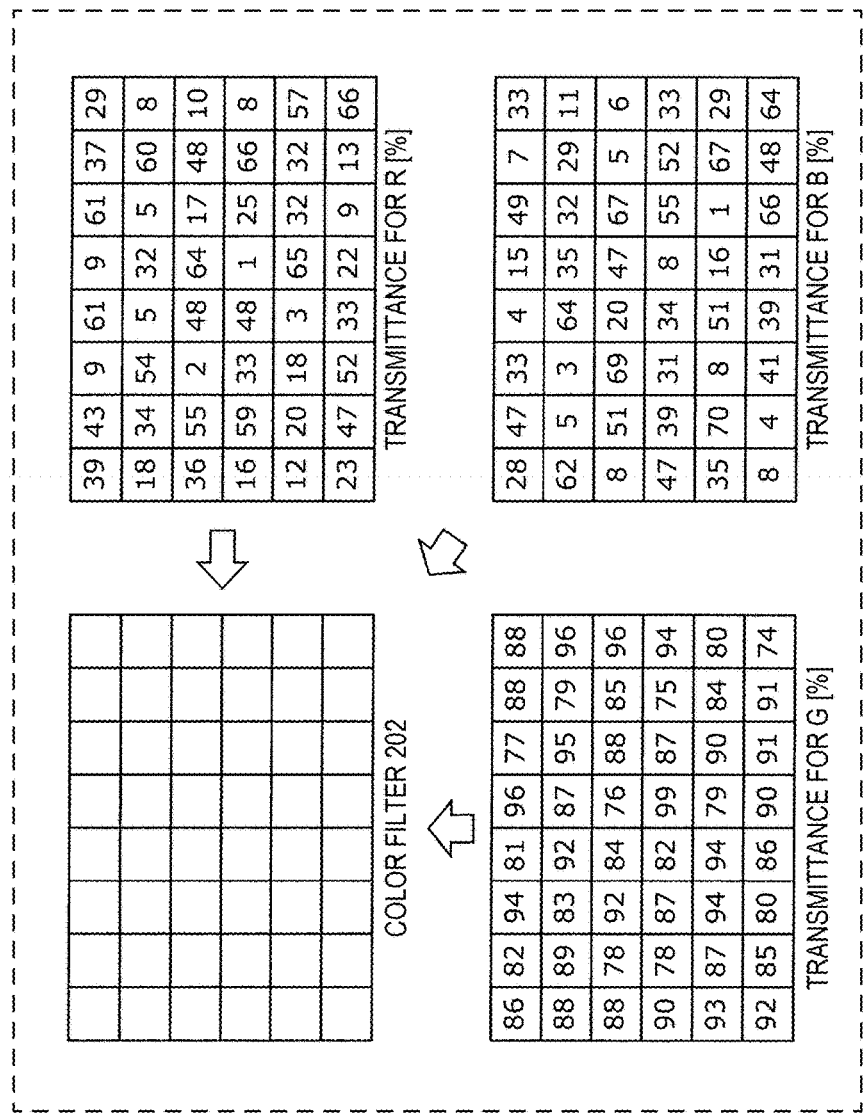
FIG. 18 is a schematic diagram illustrating a second modification of the color filter according to the embodiment.

FIG. 18 illustrates an example of the color filter 202 having transmittances based on the luminance conversion coefficients. More specifically, a transmittance for R, a transmittance for G, and a transmittance for B are indicated for each pixel. In this example, the color filter 202 has transmittances that satisfy expression (23). More specifically, the sum of products of the plurality of transmittances for each pixel in the plurality of wavelength ranges and the plurality of luminance conversion coefficients of the plurality of wavelength ranges is within a range of 71% to 72%, that is, essentially the same.

As described above, the imaging apparatus 11 according to the present embodiment includes the imaging optical system 201, the imaging device 203, the color filter 202, and the transmission data compression circuit 103.

The imaging optical system 201 forms an optical signal. The imaging device 203 includes the plurality of pixels and converts the optical signal formed on the plurality of pixels into an electrical signal. The color filter 202 is arranged between the imaging optical system 201 and the imaging device 203 and has a different optical transmittance for each of the plurality of pixels and each of a plurality of wavelength ranges. The transmission data compression circuit 103 compresses the electrical signal obtained by the imaging device 203.

In addition, the sum of products of the optical transmittance group relating to the plurality of optical transmittances of the color filter 202 for each pixel in the plurality of wavelength ranges and the coefficients, which include a coefficient different from 0, common to the plurality of pixels is the same between the plurality of pixels.

As a result, the imaging apparatus 11 can obtain various pieces of information through the various transmittances of the color filter 202. On the other hand, the plurality of optical transmittances of the color filter 202 for each pixel in the plurality of wavelength ranges are given a characteristic common to the plurality of pixels. A decrease in the similarity between neighboring pixels, therefore, is suppressed. The imaging apparatus 11 can thus perform efficient compression on the basis of the similarity between neighboring pixels. That is, the imaging apparatus 11 can more appropriately obtain information for generating an image.

For example, the coefficients may include the same coefficients. In addition, the sum of the plurality of optical transmittances of the color filter 202 for each pixel in the plurality of wavelength ranges may be the same between the plurality of pixels.

As a result, sensitivity to a signal level is equalized between the plurality of pixels, and the similarity between neighboring pixels in terms of the signal level is reflected by an electrical signal obtained by the imaging device 203. The imaging apparatus 11, therefore, can perform efficient compression on the basis of the similarity between neighboring pixels.

In addition, for example, the coefficients may be determined on the basis of relative luminous efficiencies. More specifically, the coefficients may include a plurality of coefficients indicating relative luminous efficiencies. In this case, the sensitivity of a person to brightness is equalized between the plurality of pixels, and the similarity between neighboring pixels in terms of the brightness sensed by the person is reflected by an electrical signal obtained by the imaging device 203. The imaging apparatus 11, therefore, can perform efficient compression on the basis of the similarity between neighboring pixels.

In addition, for example, the coefficients may include luminance conversion coefficients for the plurality of wavelength ranges. As a result, sensitivity to luminance is equalized between the plurality of pixels, and the similarity between neighboring pixels in terms of luminance is reflected by an electrical signal obtained by the imaging device 203. The imaging apparatus 11, therefore, can perform efficient compression on the basis of the similarity between neighboring pixels.

In addition, for example, the plurality of pixels may include a first pixel and a second pixel adjacent to the first pixel. The transmission data compression circuit 103 may then compress an electrical signal by encoding a difference between a value of the electrical signal in the first pixel and a value of the electrical signal in the second pixel. In this case, an electrical signal obtained by the imaging device 203 is efficiently compressed on the basis of the similarity between adjacent pixels.

In addition, for example, the imaging system 10 includes the imaging apparatus 11 and the image generation apparatus 12. The imaging apparatus 11 further includes the transmission circuit 104 that transmits an electrical signal compressed by the transmission data compression circuit 103.

The image generation apparatus 12 includes the reception circuit 105, the received data decoding circuit 106, and the image generation circuit 107. The reception circuit 105 receives an electrical signal transmitted from the transmission circuit 104. The received data decoding circuit 106 decompresses the electrical signal received by the reception circuit 105. The image generation circuit 107 generates an image using modulation information indicating a plurality of optical transmittances of the color filter 202 for the plurality of pixels and the plurality of wavelength ranges and the electrical signal decompressed by the received data decoding circuit 106.

As a result, the image generation apparatus 12 can efficiently receive a compressed electrical signal from the imaging apparatus 11. In addition, the image generation apparatus 12 can efficiently decompress the electrical signal regardless of modulation information regarding optical transmittances. The image generation apparatus 12 can then appropriately generate an image using the decompressed electrical signal and the modulation information. That is, the imaging system 10 can appropriately obtain an electrical signal with the imaging apparatus 11 and appropriately generate an image with the image generation apparatus 12.

As described above, the color filter 202 has a different optical transmittance for each of the plurality of pixels and each of the plurality of wavelength ranges. That is, in the color filter 202, an optical transmittance for a pixel and a wavelength range is different from an optical transmittance for the pixel and another wavelength range, and different from an optical transmittance for another pixel and the foregoing wavelength range.

For example, the plurality of pixels include the first pixel and the second pixel, and the plurality of wavelength ranges include a first wavelength range and a second wavelength range. At this time, in the color filter 202, an optical transmittance for the first pixel and the first wavelength range is different from an optical transmittance for the first pixel and the second wavelength range, and different from an optical transmittance for the second pixel and the first wavelength range.

In addition, for example, the plurality of optical transmittances of the color filter 202 for the plurality of pixels and the plurality of wavelength ranges include four different optical transmittances for two of the plurality of pixels and two of the plurality of wavelength ranges. That is, the plurality of optical transmittances of the color filter 202 for the plurality of pixels and the plurality of wavelength ranges include a plurality of optical transmittances different from one another depending on the pixel and the wavelength range.

In addition, for example, the plurality of pixels include the first pixel, the second pixel, a third pixel, and a fourth pixel. At this time, the color filter 202 corresponding to the first pixel, the second pixel, the third pixel, and the fourth pixel has different optical transmittances for the plurality of wavelength ranges. In addition, for example, the color filter 202 has three or more optical transmittances including an optical transmittance different from 0% or 100%. Here, as described above, two optical transmittances different from each other by several percent can be regarded as essentially the same transmittance. The color filter 202 can have random optical transmittances when the above-mentioned sum of products is the same between the pixels.

In addition, for example, the color filter 202 includes, for each pixel, an optical transmittance pattern, which is a pattern of a plurality of optical transmittances for the plurality of wavelength ranges. The color filter 202 includes a plurality of optical transmittance patterns for the plurality of pixels. The color filter 202 may include four or more different optical transmittance patterns, or may include five or more different optical transmittance patterns.

An electrical signal obtained by the imaging apparatus 11 indicates a value in each pixel for all the plurality of wavelength ranges. That is, optical signals for the plurality of wavelength ranges are mixed (added) in each pixel and converted into an electrical signal.

In addition, each of the plurality of wavelength ranges may correspond to colors such as R, G, and B. For example, the plurality of wavelength ranges may correspond to the three wavelength ranges of R, G, and B. Alternatively, the plurality of wavelength ranges may be defined more finely, and may correspond to four or more wavelength ranges.

In addition, the optical transmittance group may include a plurality of optical transmittances for each pixel in the plurality of wavelength ranges. Alternatively, the optical transmittance group may include a plurality of optical transmittances that define a plurality of optical transmittances for each pixel in the plurality of wavelength ranges. For example, the optical transmittance group may include a plurality of optical transmittances for each pixel at a plurality of wavelengths.

In addition, in the above embodiment, the transmission circuit 104 of the imaging apparatus 11 transmits modulation information, and the reception circuit 105 of the image generation apparatus 12 receives the modulation information. If the imaging apparatus 11 and the image generation apparatus 12 hold modulation information in advance, however, the modulation information need not be transmitted.

In addition, if the imaging apparatus 11 and the image generation apparatus 12 are integrated with each other, or if a recording medium is used to transmit information, for example, the imaging apparatus 11 need not include the transmission circuit 104, and the image generation apparatus 12 need not include the reception circuit 105. In addition, for example, an image generated by the image generation apparatus 12 may be analyzed without being output. In this case, the image generation apparatus 12 need not include the output interface device 108.

In addition, cases in which the sum of products is the same between the plurality of pixels includes a case in which the sum of products is essentially the same between the plurality of pixels and a case in which the sum of products is substantially the same between the plurality of pixels. If an error in the sum of products is within several percent between the plurality of pixels, for example the sum of products can be regarded as the same between the plurality of pixels. In addition, the expression "the sum of products is the same between the plurality of pixels" may be replaced by an expression "the sum of products has the same value between the plurality of pixels".

In addition, in the above embodiment, the components (especially the circuits) may be achieved by dedicated hardware or suitable software programs. The components may be achieved by reading and executing software programs recorded in a recording medium, such as a hard disk or a semiconductor memory, using a program execution unit, such as a central processing unit (CPU) or a processor.

In addition, the plurality of circuits included in the imaging apparatus 11 may be configured as a single circuit, or may be separate circuits. Similarly, the plurality of circuits included in the image generation apparatus 12 may be configured as a single circuit, or may be separate circuits. These circuits may be general-purpose circuits or dedicated circuits.

Although the imaging apparatus 11, the imaging system 10, and the like according to one or a plurality of aspects have been described on the basis of the embodiment, the present disclosure is not limited to the embodiment. Modes obtained by modifying the embodiment in various ways conceivable by those skilled in the art and modes constructed by combining components according to different embodiments may be included in the one or plurality of aspects insofar as the scope of the present disclosure is not deviated from.

For example, in the above embodiment, a process performed by a certain component may be performed by another component. In addition, order of execution of a plurality of processes may be changed, or a plurality of processes may be performed in parallel with each other.

The imaging apparatus in the present disclosure can be used for compressed sensing, and can be used in digital cameras, digital video cameras, mobile phones, smartphones, and the like.

What is claimed is:

1. An imaging apparatus comprising:
a lens that forms an optical signal;
an imaging device that includes a plurality of pixels in a two-dimensional array and converts the optical signal formed on the plurality of pixels into an electrical signal;
a color filter arranged between the lens and the imaging device, the color filter having a plurality of optical transmittances with one-to-one correspondence with the plurality of pixels; and
a transmission data compression circuit that compresses the electrical signal obtained by the imaging device,
wherein the plurality of pixels includes a pixel (u1, v1) and a pixel (u2, v2), and (u1, v1) and (u2, v2) are coordinates in the two-dimensional array, the pixel (u1, v1) is different from the pixel (u2, v2),
the plurality of optical transmittances are different from one another and includes a first optical transmittance $x(\lambda,u1,v1)$ of the pixel (u1, v1) and a second optical transmittance $x(\lambda,u2, v2)$ of the pixel (u2, v2), where $\lambda$ is a wavelength,
when a first wavelength is denoted by $\lambda 1$ and a second wavelength, which is different from the first wavelength $\lambda 1$, is denoted by $\lambda 2$, $x(\lambda=\lambda 1,u1,v1)$ and $x(\lambda=\lambda 1,u2,v2)$ are different from each other and $x(\lambda=\lambda 2,u1,v1)$ and $x(\lambda=\lambda 2,u2,v2)$ are different from each other, and
an integral of $F(\lambda) \times x(\lambda,u1,v1)d\lambda$ is equal to an integral of $F(\lambda) \times x(\lambda,u2v2)d\lambda$, wherein $F(\lambda)$ is a purality of coefficients and the coefficients are determined on the basis of relative luminous efficiencies of $\lambda 1$ and $\lambda 2$.

2. The imaging apparatus according to claim 1,
wherein the plurality of pixels include a first pixel and a second pixel adjacent to the first pixel, and
the transmission data compression circuit compresses the electrical signal by encoding a difference between a value of the electrical signal in the first pixel and a value of the electrical signal in the second pixel.

3. An imaging apparatus comprising:
a lens that forms an optical signal;
an imaging device that includes a plurality of pixels in a two-dimensional array and converts the optical signal formed on the plurality of pixels into an electrical signal;
a color filter arranged between the lens and the imaging device, the color filter having a plurality of optical transmittances with one-to-one correspondence with the plurality of pixels; and
a transmission data compression circuit that compresses the electrical signal obtained by the imaging device,
wherein the plurality of pixels includes a pixel (u1, v1) and a pixel (u2, v2), and (u1,v1) and (u2,v2) are coordinates in the two-dimensional array, the pixel (u1, v1) is different from the pixel (u2, v2),
the plurality of optical transmittances are different from one another and includes a first optical transmittance $x(\lambda,u1,v1)$ of the pixel (u1, v1) and a second optical transmittance $x(\lambda,u2,v2)$ of the pixel (u2, v2), where $\lambda$ is a wavelength,
when a first wavelength is denoted by $\lambda 1$ and a second wavelength, which is different from the first wavelength $\lambda 1$, is denoted by $\lambda 2$, $x(\lambda=\lambda 1,u1,v1)$ and $x(\lambda=\lambda 1,u2,v2)$ are different from each other and $x(\lambda=\lambda 2, u1,v1)$ and $x(\lambda 2,u2,v2)$ are different from each other, and
an integral of $F(\lambda) \times x(\lambda,u1,v1)d\lambda$ is equal to an integral of $F(\lambda) \times x(\mu,u2,v2)d\lambda$, where $F(\lambda)$ is a purality of coefficients and the coefficients includes conversion luminance coefficients for each of $\lambda 1$ and $\lambda 2$.

4. An imaging system comprising:
an imaging apparatus; and
an image generation apparatus,
wherein the imaging apparatus includes
a lens that forms an optical signal,
an imaging device that includes a plurality of pixels and converts the optical signal formed on the plurality of pixels into an electrical signal,
a color filter arranged between the lens and the imaging device, and
a transmission data compression circuit that compresses the electrical signal obtained by the imaging device,
wherein a sum of products of an optical transmittance group relating to a plurality of optical transmittances of the color filter for each of the plurality of pixels in a plurality of wavelength ranges and coefficients common to the plurality of pixels is the same between the plurality of pixels,
the imaging apparatus further includes a transmission circuit that transmits the electrical signal compressed by the transmission data compression circuit, and
the image generation apparatus includes
a reception circuit that receives the electrical signal transmitted from the transmission circuit,
a received data decoding circuit that decompresses the electrical signal received by the reception circuit, and
an image generation circuit that generates an image using modulation information indicating the plurality of optical transmittances of the color filter for the plurality of pixels and the plurality of wavelength ranges and the electrical signal decompressed by the received data decoding circuit.

5. An imaging apparatus comprising:
a color filter that receives a first light beam and outputs a second light beam; and
an imaging device that includes a plurality of pixels that receive the second light beam and that output a plurality of electrical signals,
wherein the color filter includes a plurality of portions that have a one-to-one relationship with the plurality of pixels,
the plurality of portions each have an optical transmittance, the optical transmittances being different from one another,
wavelength is denoted by $\lambda$, the optical transmittances include a first optical transmittance $x1(\lambda)$ and a second optical transmittance $x2(\lambda)$,
a first wavelength is denoted by $\lambda 1$ and a second wavelength, which is different from the first wavelength $\lambda 1$, is denoted by $\lambda 2$, $x1(\lambda=\lambda 1)$ and $x2(\lambda=\lambda 1)$ are different from each other, and $x1(\lambda=\lambda 2)$ and $x2(\lambda=\lambda 2)$ are different from each other, and
a visual sensation characteristic of brightness of a human eye is denoted by $F(\lambda)$, an integral of $F(\lambda) \times x1(\lambda)d\lambda$ equals an integral of $F(\lambda) \times x2(\lambda)d\lambda$.

* * * * *